(12) United States Patent
Han et al.

(10) Patent No.: US 10,296,252 B1
(45) Date of Patent: May 21, 2019

(54) REDUCING DRIVE EXTENT ALLOCATION CHANGES WHILE SPLITTING A GROUP OF STORAGE DRIVES INTO PARTNERSHIP GROUPS IN RESPONSE TO ADDITION OF A STORAGE DRIVE TO AN ARRAY OF STORAGE DRIVES IN A DATA STORAGE SYSTEM THAT USES MAPPED RAID (REDUNDANT ARRAY OF INDEPENDENT DISKS) TECHNOLOGY

(71) Applicant: EMC IP Holding Company LLC, Hopkinton, MA (US)

(72) Inventors: Geng Han, Beijing (CN); Jibing Dong, Beijing (CN); Jamin Kang, Beijing (CN); Shaoqin Gong, Beijing (CN); Xinlei Xu, Beijing (CN); Ree Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/888,155

(22) Filed: Feb. 5, 2018

(30) Foreign Application Priority Data

Jan. 31, 2018 (CN) .......................... 2018 1 0096896

(51) Int. Cl.
*G06F 3/06* (2006.01)
*G06F 11/20* (2006.01)

(52) U.S. Cl.
CPC .......... *G06F 3/0634* (2013.01); *G06F 3/0619* (2013.01); *G06F 3/0644* (2013.01);
(Continued)

(58) Field of Classification Search
CPC .... G06F 3/0617; G06F 3/0619; G06F 3/0631; G06F 3/0634; G06F 3/0644;
(Continued)

(56) References Cited

U.S. PATENT DOCUMENTS 5,579,475 A 11/1996 Blaum et al.
6,567,889 B1 5/2003 DeKoning et al.
(Continued)

OTHER PUBLICATIONS

Blaum, et al., "EVENODD: An Optical Scheme for Tolerating Double Disk Failures in RAID Architectures", RAID Architectures: IBM Research Report, RJ 9506, Sep. 1993, pp. 245-254.
(Continued)

*Primary Examiner* — Gary J Portka
(74) *Attorney, Agent, or Firm* — BainwoodHuang

(57) ABSTRACT

A mapped RAID system that reduces drive extent allocation changes when splitting a group of storage drives into a first partnership group and a second partnership group. A first drive is assigned to the first partnership group, and then additional drives are assigned to the first partnership group from the unassigned drives, such that each drive assigned to the first partnership group has a lowest movement count of all unassigned drives. A drive's movement count represents a count of drive extent allocations that must be changed if the drive is added to the first partnership group. After each drive is assigned to the first partnership group, the indication of the drive is removed from the list of unassigned drives. A group of RAID extent entries for the first partnership group consists of RAID extent entries indicating relatively higher total numbers of drive extents located in the first partnership group.

20 Claims, 16 Drawing Sheets

(52) U.S. Cl.
CPC ........ *G06F 3/0689* (2013.01); *G06F 11/2069* (2013.01); *G06F 2201/805* (2013.01); *G06F 2201/82* (2013.01)

(58) Field of Classification Search
CPC .. G06F 3/0647; G06F 3/0689; G06F 11/2069; G06F 11/2094; G06F 2201/805; G06F 2201/822
USPC .................................. 711/114; 714/6.22, 6.3
See application file for complete search history.

(56) References Cited

U.S. PATENT DOCUMENTS

| | | | |
|---|---|---|---|
| 6,857,059 B2 | 2/2005 | Karpoff et al. | |
| 7,409,625 B2 | 8/2008 | Corbett et al. | |
| 9,641,615 B1* | 5/2017 | Robins | ................ H04L 67/1097 |
| 10,126,988 B1* | 11/2018 | Han | ...................... G06F 3/0689 |
| 2004/0260967 A1 | 12/2004 | Guha et al. | |
| 2006/0075283 A1 | 4/2006 | Hartung et al. | |
| 2011/0167215 A1* | 7/2011 | Eguchi | ................ G06F 11/1076 |
| | | | 711/114 |
| 2012/0137065 A1 | 5/2012 | Odenwald et al. | |

OTHER PUBLICATIONS

Miller, Scott A., "Comparing RAID 10 and RAID 01", SMB IT Journal; Jul. 30, 2014; <<http://www.smbitjournal.com/2014/07/comparing-raid-10-and-raid-01/>> article accessed Mar. 21, 2017, 6 pages.

Patterson, et al., "A Case for Redundant Arrays of Inexpensive Disks (RAID)", Proceedings of the 1988 ACM SIGMOD International Conference on Management of Data, ACM, 1988, pp. 109-116.

Perumal, et al., "A Tutorial on RAID Storage Systems", CS04-05-00. May 6, 2004. Data Network Architectures Group. Department of Computer Science. University of Capetown, 23 pages.

* cited by examiner

|   | 0 | 2 | 3 | 4 |
|---|---|---|---|---|
| 0 | NM(0,0) | NM(2,0) | NM(3,0) | NM(4,0) |
| 2 | NM(0,2) | NM(2,2) | NM(3,2) | NM(4,2) |
| 3 | NM(0,3) | NM(2,3) | NM(3,3) | NM(4,3) |
| 4 | NM(0,4) | NM(2,4) | NM(3,4) | NM(4,4) |

PARTNERSHIP GROUP
NEIGHBORHOOD MATRIX
600 ("NM")

Fig. 6

REDUCING DRIVE EXTENT ALLOCATION CHANGES WHILE SPLITTING A GROUP OF STORAGE DRIVES INTO PARTNERSHIP GROUPS IN RESPONSE TO ADDITION OF A STORAGE DRIVE TO AN ARRAY OF STORAGE DRIVES IN A DATA STORAGE SYSTEM THAT USES MAPPED RAID (REDUNDANT ARRAY OF INDEPENDENT DISKS) TECHNOLOGY

TECHNICAL FIELD

The present disclosure relates generally to intelligent data storage systems that provide RAID (Redundant Array of Independent Disks) technology, and more specifically to technology for reducing drive extent allocation changes while splitting a group of data storage drives into partnership groups in response to the addition of a storage drive to an array of storage drives in a data storage system that uses mapped RAID technology.

BACKGROUND

Data storage systems are arrangements of hardware and software that typically include multiple storage processors coupled to arrays of non-volatile data storage devices, such as magnetic disk drives, electronic flash drives, and/or optical drives. The storage processors service host I/O operations received from host machines. The received I/O operations specify one or more storage objects (e.g. logical disks or "LUNs") that are to be written, read, created, or deleted. The storage processors run software that manages the received I/O operations and performs various data processing tasks to organize and secure the host data that is received from the host machines and stored on the non-volatile data storage devices.

Some existing data storage systems have provided RAID (Redundant Array of Independent Disks) technology. RAID is a data storage virtualization/protection technology that combines multiple physical drives into a single logical unit to provide data redundancy and/or performance improvement. Data may be distributed across the drives in one of several ways, referred to as RAID levels, depending on the required levels of redundancy and performance. Some RAID levels employ data striping ("striping") to improve performance. In general, striping involves segmenting received host data into logically sequential blocks (e.g. sequential blocks in an address space of a logical storage object), and then storing data written to consecutive blocks in the logical sequence of blocks onto different drives. A series of consecutive logically sequential data blocks that are stored across different drives may be referred to as a RAID "stripe". By spreading data segments across multiple drives that can be accessed concurrently, total data throughput can be increased.

Some RAID levels employ a "parity" error protection scheme to provide fault tolerance. When parity protection is used, one or more additional parity blocks are maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block.

One example of a RAID configuration that uses block level striping with distributed parity error protection is 4D+1P ("four data plus one parity") RAID-5. In 4D+1P RAID-5, each stripe consists of 4 data blocks and a block of parity information. In a traditional 4D+1P RAID-5 disk group, at least five storage disks are used to store the data and parity information, so that each one of the four data blocks and the parity information for each stripe can be stored on a different disk. Further in traditional RAID, a spare disk is also kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID configurations may provide data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

SUMMARY

Data storage systems providing traditional RAID data protection have significant limitations with regard to the ability to add new disks, and with regard to the amount of time required to rebuild data in the event of a disk failure. Specifically, traditional RAID systems do not support the addition of new disks on an individual disk basis, and instead require that new storage capacity be added only in numbers of disks equal to the number of disks that is required to support the specific RAID configuration, i.e. equal to the width of the RAID stripe being used. Accordingly, for traditional 4D+1P RAID-5 configurations, new disks can only be added to a traditional RAID system in increments of five disks at a time. For traditional 4D+2P RAID-6 configurations, new disks can only be added to traditional RAID systems in increments of six disks. As the capacity of individual disks has increased over time with the introduction of new storage technologies, this inflexibility in terms of adding new capacity to traditional RAID systems has become increasingly burdensome and impractical.

Also as individual disk capacity has increased, the time required by traditional RAID systems to rebuild data of an entire failed disk onto a single dedicated spare disk has increased, and the write bandwidth of the single dedicated spare disk has become a significant performance bottleneck with regard to total rebuild time. Moreover, while data previously stored on the failed disk is being rebuilt on the spare disk, concurrent failure of one or more additional disks in a traditional RAID system during the rebuilding process may introduce the risk of data loss.

The mapped RAID technology described herein improves on traditional RAID technology by allowing for the addition of individual non-volatile data storage drives to a data storage system in order to increase the storage capacity of the system, and also addresses the problem of long rebuild times in traditional RAID caused by write bandwidth bottlenecks when writing to dedicated spare disks. In the mapped RAID technology described herein, each storage drive is divided into multiple contiguous regions of non-volatile data storage referred to as "drive extents" that are allocated from a drive extent pool. A RAID extent table is generated that contains a number of RAID extent entries, each one of which indicates a set of drive extents that have been allocated to that RAID extent entry. The set of drive extents indicated by a RAID extent entry are used to store host data that is written to a corresponding portion of a logical address space representing the non-volatile storage accessed through the RAID mapping table, e.g. the host data written to a corresponding portion of the logical address space of a logical storage object. Each RAID extent entry in the RAID extent table indicates a unique set of drive extents allocated from the drive extent pool, and each one of the drive extents allocated to a given RAID extent must be located on a different storage drive. In this way, the drive extents indicated by a RAID extent entry are used to store the blocks of data and the parity information for a stripe of non-volatile data storage represented by that RAID extent entry. Accordingly, the total number of drive extents indicated by each RAID extent entry in the RAID extent table may be the same as the number of disks used in a traditional RAID system to store data blocks and parity information for the same RAID level. For example, in a mapped RAID system supporting a 4D+1P RAID-5 configuration, each RAID extent entry in the RAID extent table indicates a total of five drive extents, four of which are used to store the four blocks of host data, and one of which is used to store the parity information of the stripe represented by the RAID extent. In a 4D+2P RAID-6 mapped RAID configuration, two parity information blocks are indicated by each RAID extent entry to provide an increased level of fault tolerance, and each RAID extent entry in the RAID extent table indicates a total of six drive extents.

In the event that a drive fails in a mapped RAID system, spare drive extents can be allocated that are located on multiple storage drives that contribute to the drive extent pool in order to replace the drive extents located in the failed drive, thus advantageously increasing parallel processing by spreading the rebuild read and write operations across multiple storage drives, and effectively eliminating the write bandwidth bottleneck previously caused by traditional RAID's reliance on rebuilding to a single dedicated spare disk. In this way, mapped RAID can reduce rebuild time in the face of a single drive failure. Moreover, as the number of storage drives being used increases, the amount of concurrent processing that can be occur during the rebuild process may also increase, generally resulting in progressive improvement in rebuild performance for increasing numbers of storage drives that contribute to the drive extent pool.

However, while increasing the number of storage drives that are used to support a mapped RAID configuration may, up to a point, increase rebuild performance due to the increased ability to spread the rebuild process across larger numbers of drives, each drive added to the group of storage drives still has its own independent probability of failure at any specific time. Accordingly, the probability of one or more additional drives failing at any point in time during the rebuild process also increases as more drives are added to the group. When the total number of storage drives in the group reaches a sufficiently large number, the level of concurrent processing available during the rebuild process is no longer limited by the number of physical drives, and instead becomes limited by the availability and/or performance of one or more other resources in the data storage system, e.g. the availability and/or performance of the storage system CPUs, the availability and/or performance of the storage system memory, etc. After the number of storage drives in a group reaches such a maximum effective number, simply allowing more drives to be added still continues to increase the probability that one or more additional drives will fail during the rebuild process, without providing a further improvement in rebuild time performance. Previous systems that have simply allowed the indefinite addition of more and more individual drives have therefore caused the risk of data loss to be continuously increased, without recognizing that rebuild time performance is eventually limited predominantly by factors other than the number of storage drives that can participate in the rebuild process.

The mapped RAID technology described herein responds to the addition of a new storage drive by determining whether the total number of drives in an initial group has reached a predetermined maximum drive group size, and then responds to detecting that the total number of physical drives in the initial group has reached the predetermined maximum drive group size by splitting the initial group into a first partnership group and a second partnership group, in order to limit the risk of data loss occurring during drive rebuilds in the event of future drive failures. Each storage drive from the initial group of storage drives is contained in only one of the resulting partnership groups, and each partnership group contains a number of physical data storage drives that is less than the maximum drive group size. During the splitting process, individual RAID extent entries in the RAID mapping table are assigned to RAID extent groups, where each one of the RAID extent groups corresponds to one of the newly created partnership groups. Each RAID extent entry that is assigned to a RAID extent group must only indicate drive extents located in storage drives that are contained in the corresponding partnership group. Accordingly, in the case where a RAID extent entry is assigned to one RAID extent group and indicates a drive extent located in a storage drive that is contained in a partnership group other than the partnership group corresponding to that RAID extent group, the RAID extent must be modified to indicate a new drive extent allocated from the spare drive extents located in the storage drives contained in the partnership group corresponding to that RAID extent group, and the data stored on the drive extent contained in the partnership group other than the partnership group corresponding to the RAID extent group must be copied to the newly allocated drive extent.

Significant performance considerations arise when splitting an initial group of storage drives into the first partnership group and the second partnership group, due to the fact that each change in drive extent allocation within a RAID extent entry requires copying of the data from a previously allocated drive extent to a newly allocated drive extent. Since data copy operations are resource intensive and time consuming, it would be desirable to select storage drives for assignment to the first and second partnership group, and to select RAID extent entries for assignment to the corresponding RAID extent groups, such that changes to drive extent allocations within RAID extent entries are minimized during the splitting process, in order to avoid adversely impacting response time and/or throughput with regard to the processing of host I/O operations received by the data storage system.

The technology disclosed herein splits an initial group of storage drives into a first partnership group and a second partnership group, such that the RAID extent entries to which drive extents located in storage drives contained in the first partnership group are allocated only indicate drive extents located in the storage drives contained in the first partnership group, and such that RAID extent entries to which drive extents located in storage drives contained in the second partnership group are allocated only indicate drive extents located in the storage drives contained in the second partnership group. In the disclosed technology, splitting of the initial group of storage drives into the first partnership group and the second partnership group includes adding an indication of each storage drive in the initial group of storage drives to a list of unassigned storage drives, and assigning an initial storage drive to the first partnership group. Assigning the initial storage drive to the first partnership group includes removing the indication of the initial storage drive from the list of unassigned storage drives. Splitting of the initial group of storage drives into the first partnership group and the second partnership group further includes assigning additional storage drives to the first partnership group. Assigning each individual one of the additional storage drives to the first partnership group includes first determining a movement count for each storage drive indicated in the list of unassigned storage drives. The movement count for each storage drive is equal to a number of drive extent allocations that must be changed in the event that the storage drive is added to the first partnership group. Assigning each individual additional storage drive to the first partnership group further includes determining a storage drive indicated in the list of unassigned storage drives that has a lowest movement count of all the storage drives indicated in the list of unassigned storage drives. The storage drive indicated in the list of unassigned storage drives that has the lowest movement count of all the storage drives indicated in the list of unassigned storage drives is then assigned to the first partnership group, and the list of unassigned storage drives is updated by removing, from the list of unassigned storage drives, the indication of the storage drive indicated in the list of unassigned storage drives that has the lowest movement count of all the storage drives indicated in the list of unassigned storage drives. Splitting of the initial group of storage drives into the first partnership group and the second partnership group further includes assigning, to the second partnership group, those storage drives for which indications remain in the list of unassigned storage drives after the additional storage drives have been added to the first partnership group.

In some embodiments, determining the movement count for each storage drive indicated in the list of unassigned storage drives further includes i) identifying all RAID extent entries in the RAID mapping table that indicate a drive extent that is located in the storage drive, ii) generating, for each RAID extent entry in the RAID mapping table that indicates a drive extent that is located in the storage drive, an external drive count that is equal to a total number of disk extents indicated by that RAID extent entry that are not located in either a) the storage drive, or b) a storage drive previously assigned to the first partnership group, and iii) generating the movement count for the storage drive by summing the external drive counts for all the RAID extent entries in the RAID mapping table that indicate a drive extent that is located in the storage drive.

In some embodiments, splitting the initial group of storage drives into the first partnership group and the second partnership group may further include determining a first partnership group size that is equal to one half of a total number storage drives contained in the initial group of storage drives. In such embodiments, assigning the additional storage drives to the first partnership group may be performed by assigning additional storage drives to the first partnership group until a total number of storage drives assigned to the first partnership group is equal to the first partnership group size.

In some embodiments, splitting the initial group of storage drives into the first partnership group and the second partnership group may further include identifying a subset of the RAID extent entries in the RAID mapping table that consists of a number of RAID extent entries that each indicate a higher total number of drive extents that are located in storage drives contained in the first partnership group than other RAID extent entries in the RAID mapping table that are not included in the subset. In such embodiments, a first RAID extent group corresponding to the first partnership group may be created by assigning the RAID extent entries in the subset of RAID extent entries to the first RAID extent group. Further in such embodiments, creating a second RAID extent group corresponding the second partnership group may be created by assigning all RAID extent entries in the RAID mapping table other than the RAID extents in the subset of RAID extent entries to the second RAID extent group.

In some embodiments, identifying the subset of the RAID extent entries in the RAID mapping table that consists of the RAID extent entries that each indicate a higher total number of drive extents that are located in the storage drives contained in the first partnership group than any other RAID extent entry in the RAID mapping table not included in the subset may include calculating a total capacity of the first partnership group, such that the total capacity of the first partnership group is equal to a total number of disk extents allocated from the first partnership group to RAID extent entries in the RAID mapping table. A total number of RAID extent entries to be assigned to the first RAID extent group may be calculated that is equal to the total capacity of the first partnership group divided by the number of drive extents indicated by each RAID extent entry. In addition, for each RAID extent entry in the RAID mapping table, a corresponding first partnership group drive extent count may be generated that is equal to a total number of drive extents indicated by the RAID extent entry that are contained in the first partnership group. A sorted list of RAID extent entries may then be generated by sorting the RAID extent entries in descending order of corresponding first partnership group drive extent count. A number of RAID extent entries located at the top of the sorted list of RAID extent entries may then be selected to be assigned to the first RAID extent group, where the number of RAID extent entries located at the top of the sorted list that are selected is equal to the total number of RAID extent entries to be assigned to the first RAID extent group.

In some embodiments, modifying a drive extent indication in at least one of the RAID extent entries to reflect the splitting of the initial group of storage drives into the first partnership group and the second partnership group may include selecting, from among the first partnership group and the second partnership group, a destination partnership group and a source partnership group, by i) comparing a total number of free drive extents in the first partnership group to a total number of free drive extents in the second partnership group, ii) selecting the one of the first partnership group and the second partnership group having a larger total number of free drive extents as the destination partnership group, and iii) selecting the one of the first partnership group and the second partnership group having a smaller total number of free drive extents as the source partnership group. A drive extent to be released may then be identified that is located in one of the storage drives contained in the source partnership group and is allocated to a RAID extent entry in the RAID extent group corresponding to the destination partnership group. A new drive extent may then be allocated from the free drive extents located in the destination partnership group to the RAID extent entry in the RAID extent group corresponding to the destination partnership group, and the data stored on the drive extent to be released copied to the new drive extent. The RAID extent entry in the RAID extent group corresponding to the destination partnership group may then be modified to indicate the new drive extent instead of the drive extent to be released, and the drive extent to be released may be released to the free drive extents in the source partnership group.

Each RAID extent entry in the RAID mapping table indicates the same number of drive extents, and a minimum number of storage drives required to provide RAID data protection for the storage object in the data storage system may be greater than the number of drive extents indicated by each RAID extent entry in the RAID mapping table. In some embodiments, the maximum drive group size is at least twice as large as the minimum number of storage drives required to provide RAID data protection for the storage object in a data storage system.

A number of unallocated drive extents located in storage drives contained in the first partnership are available as free drive extents to be allocated, in response to detecting a failure of a storage drive contained in the first partnership group, to one or more RAID extent entries in the first RAID extent group, to replace drive extents located in the failed storage drive contained in the first partnership group. Similarly, a number of unallocated drive extents located in storage drives contained in the second partnership group are available as free drive extents to be allocated, in response to detecting a failure of a storage drive contained in the second partnership group, to one or more RAID extent entries in the second RAID extent group, to replace drive extents located in the failed storage drive contained in the second partnership group.

Embodiments of the disclosed technology may provide significant advantages over previous technical solutions. For example, the disclosed technology for selecting storage drives for assignment to the first and second partnership group, and for selecting RAID extent entries for assignment to the corresponding RAID extent groups, advantageously reduces the number of changes in drive extent allocations that must be performed within RAID extent entries during the splitting process. In this way the disclosed technology improves over previous systems in terms of resource utilization and time delays incurred during the splitting process. As a result, embodiments of the disclosed technology may reduce or avoid adverse performance impacts when splitting a group of storage drives into partnership groups, such as potential adverse impacts on response times and/or throughputs with regard to the processing of host I/O operations received by the data storage system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 6 is a block diagram showing an example of a partnership group neighborhood matrix generated in some embodiments;

DETAILED DESCRIPTION

Embodiments of the invention will now be described. It should be understood that the embodiments described herein are provided only as examples, in order to illustrate various features and principles of the disclosed technology, and that the invention is broader than the specific embodiments described herein.

Figure 1:
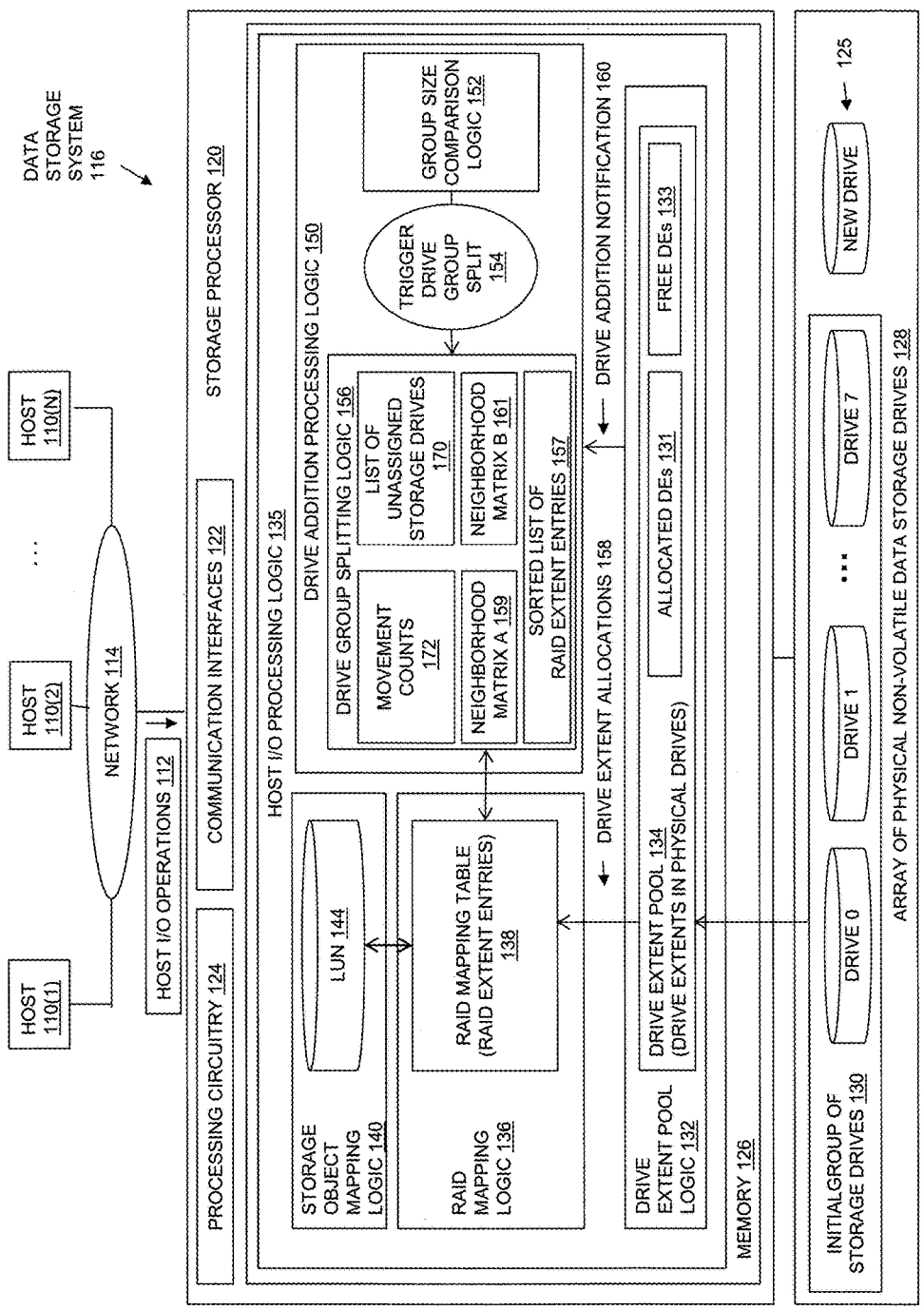
FIG. 1 is a block diagram showing a first view of operational environment for the disclosed technology, including an example of a data storage system in which the disclosed technology may be embodied, with an initial group of storage drives and a newly added storage drive.

FIG. 1 is a block diagram showing an operational environment for the disclosed technology, including an example of a data storage system in which the disclosed technology may be embodied. The operational environment of FIG. 1 includes some number of Host Computing Devices 110, referred to as "hosts" and shown for purposes of illustration by Hosts 110(1) through 110(N), that access data storage provided by Data Storage System 116, for example over one or more computer networks, such as a local area network (LAN), and/or a wide area network (WAN) such as the Internet, etc., shown in FIG. 1 by Network 114. Data Storage System 116 includes at least one Storage Processor 120 and an Array of Non-Volatile Data Storage Drives 128. Storage Processor 120 may, for example, be provided as a circuit board assembly, or "blade," which plugs into a chassis that encloses and cools multiple storage processors, and that has a backplane for interconnecting storage processors. However, no particular hardware configuration is required, and Storage Processor 120 may be embodied as any specific type of device that is capable of processing host input/output (I/O) operations received from Hosts 110 (e.g. I/O read and I/O write operations, create storage object operations, delete storage object operations, etc.).

The Array of Non-Volatile Data Storage Drives 128 may include physical data storage drives such as magnetic disk drives, solid state drives, hybrid drives, and/or optical drives. Array of Non-Volatile Data Storage Drives 128 may be directly physically connected to and/or contained within Storage Processor 120, and/or may be communicably connected to Storage Processor 120 by way of one or more computer networks, e.g. including or consisting of a Storage Area Network (SAN) or the like.

A Memory 126 in Storage Processor 120 stores program code that is executable on Processing Circuitry 124. Memory 126 may include volatile memory (e.g. RAM), and/or other types of memory. The Processing Circuitry 124 may, for example, include or consist of one or more microprocessors, e.g. central processing units (CPUs), multi-core processors, chips, and/or assemblies, and associated circuitry. Processing Circuitry 124 and Memory 126 together form control circuitry, which is configured and arranged to carry out various methods and functions as described herein. The Memory 126 stores a variety of software components that may be provided in the form of executable program code. For example, as shown in FIG. 1, Memory 126 may include software components such as Host I/O Processing Logic 135. When the program code is executed by Processing Circuitry 124, Processing Circuitry 124 is caused to carry out the operations of the software components. Although certain software components are shown and described for purposes of illustration and explanation, those skilled in the art will recognize that Memory 126 may include various other software components, such as an operating system, various applications, processes, etc.

During operation, Drive Extent Pool Logic 132 generates Drive Extent Pool 134 by first dividing each one of the physical data storage drives in the Initial Group of Storage Drives 130 into multiple, equal size drive extents, each of which consists of physically contiguous non-volatile data storage located on a drive. For example, Drive Extent Pool Logic 132 may divide each one of the physical data storage drives in the Array of Physical Non-Volatile Data Storage Devices 128 into a fixed number of equal size drive extents of physically contiguous non-volatile storage, and then add each one of the resulting drive extents to Drive Extent Pool 134. The drive extents in Drive Extent Pool 134 may each either be i) one of Allocated Drive Extents 131 that are allocated to a RAID extent entry in the RAID Mapping Table 138, or ii) one of Free Drive Extents 133 that are unallocated "spare" drive extents available for future allocation to RAID extent entries in RAID Mapping Table 138, e.g. in response to a failure condition, to replace, within RAID extent entries in RAID Mapping Table 138, drive extents located on a failed drive in the Initial Group of Storage Drives 130, and/or as new drive extents that are used to replace previously allocated drive extents when modifying RAID extent entries to reflect the splitting of the Initial Group of Storage Drives 130 into multiple partnership groups.

The Initial Group of Storage Drives 130 from which Drive Extent Pool 134 is generated may consist of all the physical data storage drives in Array of Physical Non-Volatile Data Storage Drives 128, or only a subset of the physical data storage drives in Array of Physical Non-Volatile Data Storage Drives 128. Accordingly, the disclosed techniques may be embodied such that Array of Physical Non-Volatile Data Storage Drives 128 includes multiple separate groups of physical data storage drives, each one of which may be used to independently generate a separate pool of drive extents, and that may be split into partnership groups, as described herein.

The size of the drive extents into which the physical drives in the Initial Group of Storage Drives 130 are divided is the same for every physical data storage drive in the Initial Group of Storage Drives 130. Various specific sizes of drive extents may be used in different embodiments. For example, in some embodiments each drive extent may have a size of 10 gigabytes. Larger or smaller drive extent sizes may be used in the alternative. Any specific number of physical data storage drives may be contained in the Initial Group of Storage Drives 130 and divided into equal size drive extents to generate Drive Extent Pool 134. The physical data storage drives in the Initial Group of Storage Drives 130 may each have the same total capacity, and may accordingly each be divided into the same number of drive extents. Alternatively, the physical data storage drives in Initial Group of Storage Drives 130 may have a variety of different capacities, resulting in different physical data storage drives being divided into different numbers of equal size drive extents.

After dividing each one of the physical data storage drives in the Initial Group of Storage Drives 130 into multiple, equal size drive extents of physically contiguous non-volatile data storage, and adding the resulting drive extents to Drive Extent Pool 134, drive extents may be allocated at 158 to specific RAID extent entries contained in RAID Mapping Table 138. The drive extents allocated to each RAID extent entry are used to store host data that is written to a corresponding portion (a "RAID extent") of a logical address space of the storage object LUN 144. For example, a drive extent may be allocated from Drive Extent Pool 134 to a specific RAID extent entry contained in RAID Mapping Table 138 in response to an allocation request from RAID Mapping Logic 136, and then subsequently used to store host data that is directed to a portion of an address space of LUN 144 that corresponds to that specific RAID extent entry.

In some embodiments, drive extents are allocated to RAID extent entries in the RAID Mapping Table 138, both before and after Initial Group of Storage Drives 130 is split into multiple partnership groups, such that no two drive extents indicated by any single RAID extent entry are located on the same physical storage drive.

A drive extent may be released (i.e. deallocated) from a specific RAID extent entry back to Drive Extent Pool 134, and thereby made available for allocation to a different RAID extent entry, in response to a deallocation request or the like from RAID Mapping Logic 136, e.g. when the drive extent is no longer needed to store host data.

When a drive extent is allocated to a RAID extent entry, an indication of the drive extent is stored in the RAID extent entry. For example, a drive extent allocated to a RAID extent entry may be indicated within that RAID extent entry by a pair of indexes "m|n" that are stored in the RAID extent entry, in which "m" indicates a drive index of the physical data storage drive on which the drive extent is located (e.g. a numeric drive number within Array of Physical Non-Volatile Storage Drives 128, a slot number within which the physical drive located, or a textual drive name, etc.), and "n" indicates an index of the drive extent within the physical data storage drive (e.g. a numeric drive extent number, a block offset, a sector number, etc.). For example, in embodiments in which physical data storage drives are indexed within Array of Physical Non-Volatile Data Storage Devices 128 starting with 0, and in which drive extents are indexed within the physical data storage drive that contains them starting with 0, a first drive extent of a first physical data storage drive within Array of Physical Non-Volatile Data Storage Drives 128 may be represented by "0|0", a second drive extent within the first physical data storage drive within Array of Physical Non-Volatile Data Storage Drives 128 may be represented by "0|1", and so on.

Host I/O Processing Logic 135 may expose one or more logical storage objects to Hosts 110 for reading and/or writing host data, so that Hosts 110 can issue Host I/O Operations 112 to specific storage objects, e.g. using names or other identifiers of the storage objects. The storage objects exposed to Host I/O Operations 112 may be written, read, created, and/or deleted by Hosts 110 through Host I/O Operations 112. The storage objects exposed to Hosts 110 may include or consist of logical disks sometimes referred to as "LUNs", such as LUN 144. The storage objects exposed to Hosts 110 may alternatively include or consist of a host file system, virtual volume, and/or some other type of storage object, which Host I/O Processing Logic 135 makes accessible to Hosts 110 for reading and/or writing host data.

Storage Object Mapping Logic 140 may be embodied to direct host data written to individual portions of a logical address space of LUN 144, e.g. to discrete sets of consecutive blocks in the logical address space of LUN 144, to specific individual corresponding RAID extent entries in RAID Mapping Table 138. In this way the host data written to each set of consecutive blocks in the logical address space is persistently stored in drive extents indicated by a RAID extent entry corresponding to those blocks, and parity information can be calculated and stored in at least one of the drive extents of the RAID extent entry to support data recovery. For example, an address space of LUN 144 may be made up of a set of sequential, equal size logical blocks of address space. Each host write I/O operation may indicate a specific block to be written within the address space of the LUN 144, e.g. using a logical block number (e.g. a logical block address) or offset into LUN 144. In some embodiments, 4D+1P RAID-5 block level striping with distributed parity error protection may be used, with each RAID stripe consisting of four data blocks and a block of parity information, and each RAID stripe being represented by a single RAID extent entry and mapped to drive extents indicated by that RAID extent entry. In such embodiments, each RAID extent entry may indicate five drive extents. For each set of four consecutive blocks in the logical address space of LUN 144 that are mapped to a single RAID extent entry, host data may be striped across the drive extents indicated by that RAID extent entry by storing host data written to consecutive ones of the four consecutive blocks of the logical address space into different ones of four of the drive extents indicated by that RAID extent entry. Parity information may be calculated and stored in a fifth drive extent indicated by the RAID extent entry, e.g. as an XOR of the host data stored in the other four drive extents indicated by the RAID extent entry. In this way, host data stored in any one of the four drive extents indicated by the RAID extent entry that store host data can be recovered in the event of a failure of a physical data storage drive containing one of the four drive extents indicated by the RAID extent entry that store host data, for example by performing one or more XOR operations on the data stored in the three surviving drive extents indicated by the RAID extent entry that store host data, in combination with the parity information stored in the fifth drive extent indicated by the RAID extent entry.

Further during operation, Drive Extent Pool Logic 132 detects the addition of a new physical storage drive, i.e. New Drive 125, to the Array of Physical Non-Volatile Data Storage Drives 128. For example, Drive Extent Pool Logic 132 may receive an indication that New Drive 125 has been inserted into Array of Physical Non-Volatile Data Storage Drives 128. In response to detecting that New Drive 125 has been added, Drive Extent Pool Logic 132 may pass an indication that New Drive 125 has been added to the Drive Addition Processing Logic 150, as shown by Drive Addition Notification 160.

In response to receiving the Drive Addition Notification 160 from Drive Extent Pool Logic 132, Drive Addition Processing Logic 150 causes Group Size Comparison Logic 152 to compare the total number of storage drives in the Initial Group of Storage Drives 130 to a maximum drive group size. The maximum drive group size may, for example, be an integer configuration value that is set by a system administrator, or that is provided to Storage Processor 120 in some other way. The value of the maximum drive group size may, for example, be the output of or reflect performance tests performed on Data Storage System 116 and/or similar devices, under actual or simulated drive failure conditions, with different numbers of physical data storage devices contained in Initial Group of Storage Drives 130. For example, the value of the maximum drive group size may indicate a maximum number of physical data storage drives that may be contained in Initial Group of Storage Drives 130 before the level of concurrent processing available during the rebuild process becomes limited by the availability and/or performance of one or more resources in the data storage system other than the physical drives, e.g. by the availability and/or performance of Processing Circuitry 124, and/or the availability and/or performance of Memory 126, etc., such that using numbers of storage drives in Initial Group of Storage Drives 130 larger than the maximum drive group size fails to provide a significant improvement (i.e. significant or sufficient decrease) in the time required to perform a rebuild process following a failure of one of the physical data storage drives.

For purposes of explanation, the total number of storage drives in the Initial Group of Storage Drives 130 is 8, and the maximum drive group size is 8. Accordingly, Group Size Comparison Logic 152 detects that the total number of physical data storage drives in the Initial Group of Storage Drives 130 is equal to the maximum drive group size.

In response to Group Size Comparison Logic 152 detecting that the total number of physical data storage drives in Initial Group of Storage Drives 130 is equal to the maximum drive group size, Group Size Comparison Logic 152 sends a trigger (e.g. Trigger Drive Group Split 154) to Drive Group Splitting Logic 156, such as a message or other indication, that causes Drive Group Splitting Logic 156 to split the Initial Group of Storage Drives 130 into multiple partnership groups, and to split RAID Mapping Table 138 into multiple RAID extent groups that each correspond to a respective one of the resulting partnership groups, prior to adding New Drive 125 to one of the resulting partnership groups.

Figure 2:
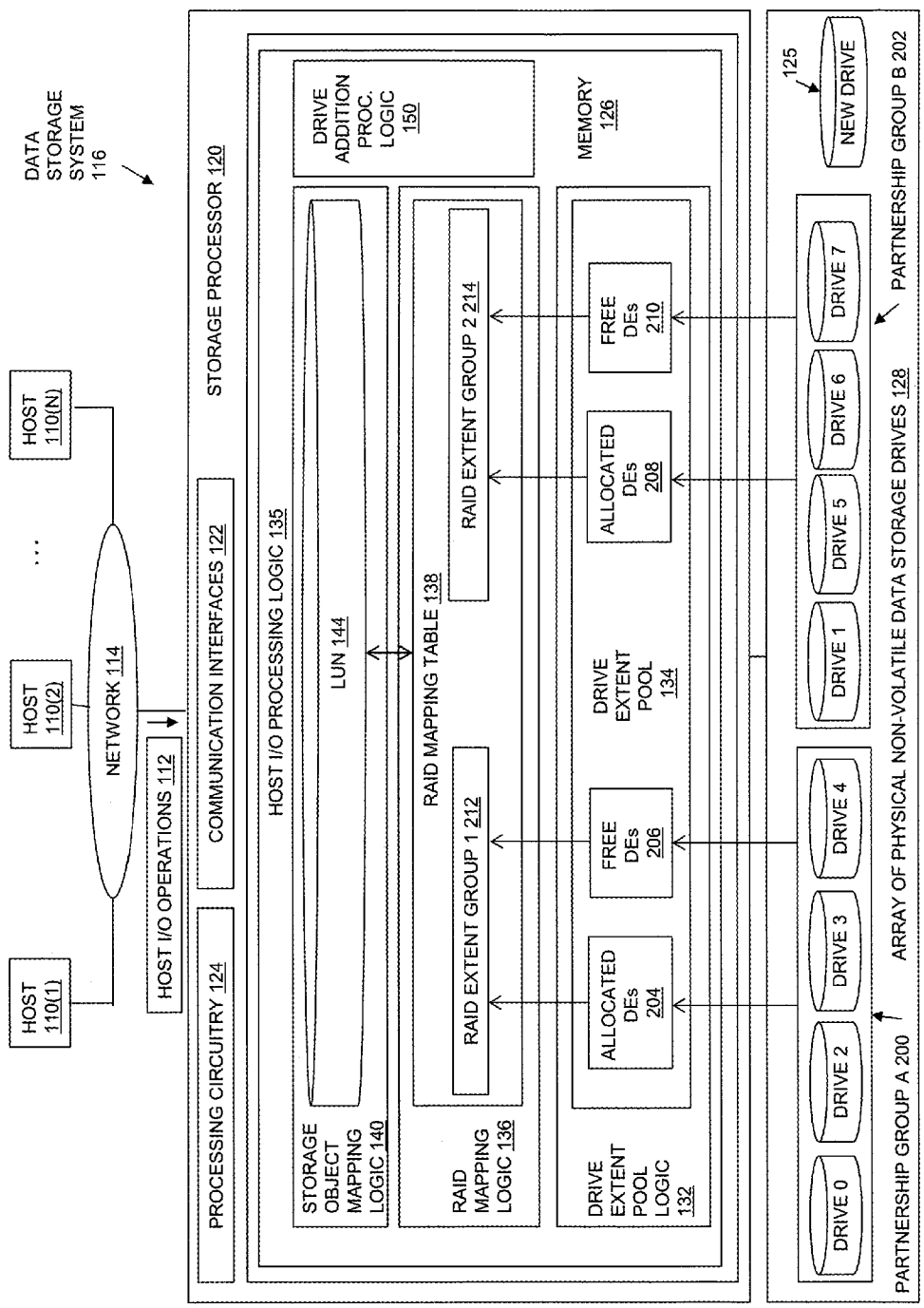
FIG. 2 is a block diagram showing another view of the operational environment of FIG. 1, showing an example in which the initial group of storage drives shown in FIG. 1 is split into two partnership groups.

For example, as shown in FIG. 2, a trigger from Group Size Comparison Logic 152 that is issued to Drive Group Splitting Logic 156 in response to Group Size Comparison Logic 152 detecting that the total number of physical data storage drives in the Initial Group of Storage Drives 130 is equal to the maximum drive group size causes Drive Group Splitting Logic 156 to split the Initial Group of Storage Drives 130 into a Partnership Group A 200 that is made up of storage drives 0, 2, 3 and 4, and a Partnership Group B 202 that is made up of storage drives 1, 5, 6 and 7.

FIG. 2 further illustrates an example of operation of the disclosed system in which the Initial Group of Storage Drives 130 of FIG. 1 is split by Drive Group Splitting Logic 156 of FIG. 1 into a first partnership group and a second partnership group, shown by Partnership Group A 200 and Partnership Group B 202 respectively. As a result of the split, each storage drive from the Initial Group of Storage Drives 130 is contained in only one of the partnership groups, e.g. each of the storage drives 0 through 7 is contained in only one of either Partnership Group A 200 or Partnership B 202. Further in the example of FIG. 2, each one of the partnership groups that are created by Drive Group Splitting Logic 156 both i) contains half of the storage drives from Initial Group of Storage Drives 130, and ii) contains a total number of storage drives that is less than the maximum drive group size. In the example of FIG. 2, each one of Partnership Group A 200 and Partnership Group B 202 contains 4 physical drives, which is less than the example maximum drive group size of 8. New Drive 125 may then subsequently be added to either one of Partnership Group A 200 or Partnership Group B 202 without exceeding the maximum drive group size.

In the disclosed technology, while splitting Initial Group of Storage Drives 130 into Partnership Group B 202, Drive Group Splitting Logic 156 selects the specific storage drives to be assigned to Partnership Group A 200 and the specific storage drives to be assigned to Partnership Group B 202 in a way that reduces the number of changes in drive extent allocations that must be performed within the RAID extent entries in RAID Mapping Table 138 during the splitting process. Specifically, Drive Group Splitting Logic 156 first adds an indication of each storage drive in the Initial Group of Storage Drives 130 to a list of unassigned storage drives, shown in FIG. 1 as List of Unassigned Storage Drives 170. For example, Drive Group Splitting Logic 156 may add the names of storage drives, e.g. "Drive 0", "Drive 1", "Drive 2", "Drive 3", "Drive 4", "Drive 5", "Drive 6", and "Drive 7", to List of Unassigned Storage Drives 170. Drive Group Splitting Logic 156 then assigns an initial storage drive to the Partnership Group A 200. For example, Drive Group Splitting Logic 156 may assign Drive 0 to Partnership Group A 200 as the initial storage drive. Assigning the initial storage drive to Partnership Group A 200 includes Drive Group Splitting Logic 156 removing the indication of the initial storage drive (e.g. "Drive 0") from the List of Unassigned Storage Drives 170.

Splitting Initial Group of Storage Drives 130 into Partnership Group A 200 and Partnership Group B 202 by Drive Group Splitting Logic 156 also includes assigning multiple additional storage drives to Partnership Group A 200. Assigning each individual one of the additional storage drives to Partnership Group A 200 includes Drive Group Splitting Logic 156 generating Movement Counts 172, by first determining a movement count for each storage drive indicated in the List of Unassigned Storage Drives 170. The movement count for each storage drive indicated in the List of Unassigned Storage Drives 170 is equal to the number of drive extent allocations that must be changed in the event that that storage drive is added to Partnership Group A 200. Assigning each individual one of the additional storage drives to Partnership Group A 200 by Drive Group Splitting Logic 156 further includes Drive Group Splitting Logic 156 determining a storage drive indicated in the List of Unassigned Storage Drives 170 that has a lowest movement count of all the storage drives indicated in the List of Unassigned Storage Drives 170. Drive Group Splitting Logic 156 then assigns the storage drive indicated in the List of Unassigned Storage Drives 170 that has the lowest movement count of all the storage drives indicated in the List of Unassigned Storage Drives 170 to Partnership Group A 200. Drive Group Splitting Logic 156 then updates the List of Unassigned Storage Drives 170 by removing, from the List of Unassigned Storage Drives 170, the indication of the storage drive indicated in the List of Unassigned Storage Drives 170 that has the lowest movement count of all the storage drives indicated in the List of Unassigned Storage Drives 170, and that has been assigned to Partnership Group A 200.

For example, after Drive 0 was assigned as the initial storage drive to Partnership Group A 200, in the case where the storage drive indicated in the List of Unassigned Storage Drives 170 that has the lowest movement count of all the storage drives indicated in the List of Unassigned Storage Drives 170 is Drive 2, then Drive Group Splitting Logic 156 would assign Drive 2 to Partnership Group A 200 and remove the indication of Drive 2 (e.g. "Drive 2") from the List of Unassigned Storage Drives 170. If after Drive 2 was assigned to Partnership Group A 200 the storage drive indicated in the List of Unassigned Storage Drives 170 that has the lowest movement count of all the storage drives indicated in the List of Unassigned Storage Drives 170 is Drive 3, then Drive Group Splitting Logic 156 would assign Drive 3 to Partnership Group A 200 and remove the indication of Drive 3 (e.g. "Drive 3") from the List of Unassigned Storage Drives 170. And if after Drive 3 was assigned to Partnership Group A 200 the storage drive indicated in the List of Unassigned Storage Drives 170 that has the lowest movement count of all the storage drives indicated in the List of Unassigned Storage Drives 170 is Drive 4, then Drive Group Splitting Logic 156 would assign Drive 4 to Partnership Group A 200 and remove the indication of Drive 4 (e.g. "Drive 4") from the List of Unassigned Storage Drives 170.

Drive Group Splitting Logic 170 continues assigning individual additional storage drives to Partnership Group A 200 as described above until a total number of storage drives assigned to Partnership Group A 200 is equal to a predetermined group size for Partnership Group A 200. Splitting of the Initial Group of Storage Drives 130 into Partnership Group A 200 and Partnership Group B 202 by Drive Group Splitting Logic 156 may further include assigning, to Partnership Group B 202, those storage drives for which indications remain in the List of Unassigned Storage Drives 170 after the additional storage drives have been added by Drive Group Splitting Logic 156 to Partnership Group A 200. For example, in the case where. Drive 0 was assigned as the initial storage drive to Partnership Group A 200, and where the additional storage drives added to Partnership Group A 200 were Drive 2, Drive 3, and Drive 4, then indications of Drive 1, Drive 5, Drive 6, and Drive 7 (e.g. "Drive 1", "Drive 5", "Drive 6", and "Drive 7") would remain in the List of Unassigned Storage Drives 170. In such a case, Drive 1, Drive 5, Drive 6, and Drive 7 would be assigned to Partnership Group B 202, as shown in FIG. 2.

In some embodiments, when selecting each additional storage drive to be assigned to Partnership Group A 200, for each storage drive indicated in the List of Unassigned Storage Drives 170, Drive Group Splitting Logic 156 determines a movement count at least in part by i) identifying all RAID extent entries in the RAID Mapping Table 138 that indicate a drive extent that is located in the storage drive, ii) generating, for each RAID extent entry in the RAID Mapping Table 138 that indicates a drive extent that is located in the storage drive, an external drive count that is equal to a total number of disk extents indicated by that RAID extent entry that are not located in either a) the storage drive, or b) a storage drive previously assigned to Partnership Group A 200, and iii) generating the movement count for the storage drive by summing the external drive counts for all the RAID extent entries in RAID Mapping Table 138 that indicate a drive extent that is located in the storage drive.

In some embodiments, splitting the Initial Group of Storage Drives 130 into Partnership Group A 200 and Partnership Group B 202 may include determining a group size for Partnership Group A 200 that is equal to one half of the total number of storage drives contained in the Initial Group of Storage Drives 130. For example, in the case where the total number of storage drives in the Initial Group of Storage Drives 130 is eight, the group size for Partnership Group A 200 would be four. In such embodiments, assigning the additional storage drives to Partnership Group A 200 is performed by Drive Group Splitting Logic 156 by assigning additional storage drives to Partnership Group A 200 until a total number of storage drives assigned to Partnership Group A 200 is equal to the group size for Partnership Group A 200.

Also while splitting Initial Group of Storage Drives 130 into Partnership Group A 200 and Partnership Group B 202, Drive Group Splitting Logic 156 assigns the RAID extent entries in RAID Mapping Table 138 to multiple RAID extent groups, as for example shown in FIG. 2 by RAID Extent Group 1 212 and RAID Extent Group 2 214. Each one of RAID Extent Group 1 212 and RAID Extent Group 2 214 contains multiple RAID extent entries, and corresponds to one of the partnership groups of storage drives. For example, RAID Extent Group 1 212 corresponds to Partnership Group A 200, and RAID Extent Group 2 214 corresponds to Partnership Group B 202.

The RAID extent entries in each RAID extent group can only indicate drive extents that are located in storage drives that are contained in the corresponding one of the partnership groups. Accordingly, RAID extent entries in RAID Extent Group 1 212 can only indicate drive extents in the Allocated Drive Extents 204, and all drive extents in Allocated Drive Extents 204 must be located in and allocated from storage drives contained in Partnership Group A 200. Similarly, RAID extent entries in RAID Extent Group 2 214 can only indicate drive extents in the Allocated Drive Extents 208, and all drive extents in Allocated Drive Extents 208 must be located in and allocated from storage drives contained in Partnership Group B 202.

Again with reference to FIG. 2, drive extents located in storage drives that are contained in Partnership Group A 200 but are not allocated, i.e. that are not contained in Allocated Drive Extents 204, are shown by Free Drive Extents 206. Free Drive Extents 206 are available for allocation to RAID extent entries in RAID Extent Group 1 212. Similarly, those drive extents located in storage drives that are contained in Partnership Group B 202 but are not allocated, i.e. that are not contained in Allocated Drive Extents 208, are shown by Free Drive Extents 210. Free Drive Extents 210 are available for allocation to RAID extent entries in RAID Extent Group 2 214.

The unallocated drive extents in Free Drive Extents 206 are available to be allocated, i) in response to detecting a failure of a storage drive contained in Partnership Group A 200, to one or more RAID extent entries in the RAID Extent Group 1 212, to replace drive extents located in the failed storage drive contained in Partnership Group A 200, and/or ii) as new drive extents that are used to replace previously allocated drive extents when modifying RAID extent entries in RAID Extent Group 1 212 to reflect the splitting of the Initial Group of Storage Drives 130 into Partnership Group A 200 and Partnership Group B 202. Similarly, the unallocated drive extents in Free Drive Extents 210 are available as spare drive extents to be allocated, i) in response to detecting a failure of a storage drive contained in Partnership Group B 202, to one or more RAID extent entries in the RAID Extent Group 2 214, to replace drive extents located in the failed storage drive contained in Partnership Group B 202, and/or ii) as new drive extents that are used to replace previously allocated drive extents when modifying RAID extent entries in RAID Extent Group 2 214 to reflect the splitting of the Initial Group of Storage Drives 130 into Partnership Group A 200 and Partnership Group B 202.

In some embodiments, in response to Initial Group of Storage Drives 130 being split into Partnership Group A 200 and Partnership Group B 202, Drive Group Splitting Logic 156 may identify a subset of the RAID extent entries in RAID Mapping Table 136 that consists of a number of RAID extent entries that each indicate a higher total number of drive extents located in the storage drives contained in Partnership Group A 200 than any RAID extent entry in RAID Mapping Table 138 that is not contained in the subset. Drive Group Splitting Logic 156 may then create RAID Extent Group 1 212 corresponding to Partnership Group A 200 by assigning the RAID extent entries contained in that subset of RAID extent entries in RAID Mapping Table 138 to RAID Extent Group 1 212. Drive Group Splitting Logic 156 may then create RAID Extent Group 2 214 corresponding to Partnership Group B 202 by assigning all other RAID extent entries in RAID Mapping Table 136, i.e. all RAID extent entries other than the RAID extent entries contained in the previously identified subset of RAID extent entries, to RAID Extent Group 2 214.

In some embodiments, Drive Group Splitting Logic 156 identifies the subset of the RAID extent entries in RAID Mapping Table 138 that consists of the RAID extent entries in RAID Mapping Table 138 that each indicate a higher total number of drive extents located in the storage drives contained in Partnership Group A 200 than any RAID extent entry in the RAID Mapping Table 138 that is not included in the subset by i) calculating a total capacity of Partnership Group A 200 that is equal to the total number of disk extents allocated from Partnership Group A 200 to all RAID extent entries in the RAID Mapping Table 138, ii) calculating a total number of RAID extent entries to be assigned to RAID Extent Group 1 212 that is equal to the total capacity of Partnership Group A 200 divided by the number of drive extents indicated by each RAID extent entry, iii) generating, for each RAID extent entry in RAID Mapping Table 138, a corresponding first partnership group drive extent count that is equal to a total number of drive extents indicated by that RAID extent entry that are contained in Partnership Group A 200, iv) generating a Sorted List of RAID Extent Entries 157 (FIG. 1) by sorting the RAID extent entries in RAID Mapping Table 138 in descending order of corresponding first partnership group drive extent count, and v) selecting a number of RAID extent entries that are located at the top of the Sorted List of RAID Extent Entries 157 that is equal to the total number of RAID extent entries to be assigned to the first RAID Extent Group 1 212.

In some embodiments, dividing the RAID extents in RAID Mapping Table 138 by Drive Group Splitting Logic 156 into RAID Extent Group 1 212 and RAID Extent Group 2 214 includes, after each RAID extent entry in RAID Mapping Table 138 has been assigned to one of either RAID Extent Group 1 212 or RAID Extent Group 2 214, identifying at least one RAID extent entry that indicates at least one drive extent that is located in a storage drive that is contained in a partnership group other than the partnership group that corresponds to the RAID extent group to which that RAID extent entry is assigned. For example, Drive Group Splitting Logic 156 may identify a RAID extent entry in RAID Extent Group 1 212 that indicates a drive extent that is located in a storage drive that is contained in Partnership Group B 202. Similarly, Drive Group Splitting Logic 156 may identify a RAID extent entry in RAID Extent Group 2 214 that indicates a drive extent that is located in a storage drive that is contained in Partnership Group A 200.

After at least one RAID extent entry has been identified that indicates at least one drive extent that is located in a storage drive that is contained in a partnership group other than the partnership group that corresponds to the RAID extent group to which that RAID extent entry is assigned, Drive Group Splitting Logic 156 may modify each RAID extent entry that indicates at least one drive extent that is located in a storage drive that is contained in a partnership group other than the partnership group that corresponds to the RAID extent group to which that RAID extent entry is assigned to indicate only drive extents that are located in storage drives that are contained in the partnership group that corresponds to the RAID extent group to which that RAID extent entry is assigned.

For example, in the case of a RAID extent entry in RAID Extent Group 1 212 that indicates a drive extent that is located in a storage drive that is contained in Partnership Group B 202, Drive Group Splitting Logic 156 may allocate a new drive extent from Partnership Group A 200, and, for that RAID extent entry, replace the drive extent located in the storage drive contained in Partnership Group B 202 with the new drive extent allocated from Partnership Group A 200. Replacing the drive extent located in the storage drive contained in Partnership Group B 202 with the new drive extent allocated from Partnership Group A 200 may include replacing, in the RAID extent entry, an indication of the drive extent located in the storage drive contained in Partnership Group B 202 with an indication of the new drive extent allocated from Partnership Group A 200, and copying host data previously stored on the drive extent located in the storage drive contained in Partnership Group B 202 to the new drive extent allocated from Partnership Group A 200.

In another example, in the case of a RAID extent entry in RAID Extent Group 2 214 that indicates a drive extent that is located in a storage drive that is contained in Partnership Group A 200, Drive Group Splitting Logic 156 may allocate a new drive extent from Partnership Group B 202, and, for that RAID extent entry, replace the drive extent located in the storage drive contained in Partnership Group A 200 with the new drive extent allocated from Partnership Group B 202. Replacing the drive extent located in the storage drive contained in Partnership Group A 200 with the new drive extent allocated from Partnership Group B 202 may include replacing, in the RAID extent entry, an indication of the drive extent located in the storage drive contained in Partnership Group A 200 with an indication of the new drive extent allocated from Partnership Group B 202, and copying host data previously stored on the drive extent located in the storage drive contained in Partnership Group A 200 to the new drive extent allocated from Partnership Group B 202.

In some embodiments, Drive Group Splitting Logic 156 modifies at least one drive extent indication in at least one of the RAID extent entries in RAID Mapping Table 138 to reflect the splitting of Initial Group of Storage Drives 130 into Partnership Group A 200 and Partnership Group B 202 by first selecting, from among Partnership Group A 200 and Partnership Group B 202, a destination partnership group and a source partnership group. For example, Drive Group Splitting Logic 156 may select a destination partnership group and a source partnership group by i) comparing a total number of free drive extents in Partnership Group A 200 (e.g. Free Drive Extents 206) to a total number of free drive extents in Partnership Group B 202 (e.g. Free Drive Extents 210), ii) selecting the one of Partnership Group A 200 and Partnership Group B 202 that has a larger total number of free drive extents as the destination partnership group, and iii) selecting the one of Partnership Group A 200 and Partnership Group B 202 that has a smaller total number of free drive extents as the source partnership group. Drive Group Splitting Logic 156 may then identify a drive extent to be released that is located on one of the storage drives contained in the source partnership group and that is allocated to a RAID extent entry in the RAID extent group corresponding to the destination partnership group. Drive Group Splitting Logic 156 may then allocate a new drive extent from the free drive extents in the destination partnership group to the RAID extent entry in the RAID extent group corresponding to the destination partnership group, and to which the drive extent to be released is allocated. The data stored on the drive extent to be released may then be copied to the new drive extent, and the RAID extent entry in the RAID extent group corresponding to the destination partnership group may be modified to indicate the new drive extent instead of the drive extent to be released. The drive extent to be released may then be released to the free drive extents of the source partnership group.

In some embodiments, Drive Group Splitting Logic 156 may allocate the new drive extent from the free drive extents in the destination partnership group by first generating a neighborhood matrix for the destination partnership group. For example, in the case where the destination partnership group is Partnership Group A 200, Drive Group Splitting Logic 156 may have previously generated Neighborhood Matrix A 159 (FIG. 1). In the case where the destination partnership group is Partnership Group B 202, Drive Group Splitting Logic 156 may have previously generated Neighborhood Matrix B 161. Each element in the neighborhood matrix for the destination partnership group corresponds to a pair of storage drives contained in the destination partnership group, and stores a value equal to a total number of RAID extent entries in the RAID extent group corresponding to the destination partnership group that indicate both i) at least one drive extent located on a first one of the storage drives in the pair of storage drives corresponding to the element, and ii) at least one drive extent located on a second one of the storage drives in the pair of drives corresponding to the element. Drive Group Splitting Logic 156 may then generate a list of candidate drives that are contained in the destination partnership group, where each one of the candidate drives has located thereon at least one free drive extent. Drive Group Splitting Logic 156 may then assign, to each one of the candidate drives in the list of candidate drives, a variance weighting that is equal to a variance of the values of the elements in the neighborhood matrix for the destination partnership group that would result from modifying the neighborhood matrix to indicate that the new drive extent was allocated from the candidate drive. Drive Group Splitting Logic 156 may then select the one of the candidate drives that has the lowest assigned variance weighting, and allocate the new drive extent from the candidate drive having the lowest assigned variance weighting.

Each RAID extent entry in the RAID Mapping Table 138 indicates the same number of drive extents. For example, in some embodiments configured to provide 4D+1P RAID-5 protection for LUN 144, each RAID extent entry in the RAID Mapping Table 138 may represent a single data stripe by indicating five drive extents, where each one of the five drive extents is located on a different storage drive, and where four of the drive extents are used to store host data written to LUN 144 and one of the drive extents is used to store parity information. In order to provide drive diversity with regard to spare drive extents, the minimum number of storage drives (e.g. in Initial Group of Storage Drives 130, Partnership Group A 200, and/or Partnership Group B 202), that is required to provide 4D+1P RAID-5 protection for LUN 144 must be greater than five, i.e. six or more. In another example, in some embodiments configured to provide 4D+2P RAID-6 protection for LUN 144, each RAID extent entry in the RAID Mapping Table 138 may represent a single data stripe by indicating six drive extents, where each of the six drive extents is located on a different storage drive, and where four of the drive extents are used to store host data written to LUN 144 and two of the drive extents are used to store parity information. In order to provide drive diversity with regard to providing spare drive extents, the minimum number of physical data storage drives (e.g. in Initial Group of Storage Drives 130, Partnership Group A 200, and/or Partnership Group B 202), that is required to provide 4D+2P RAID-6 protection for LUN 144 must be greater than six, i.e. seven or more. In either of these examples, the minimum number of storage drives required to provide RAID data protection for LUN 144 may be greater than the number of drive extents indicated by each RAID extent entry in the RAID Mapping Table 138. In some embodiments, the maximum drive group size may be at least twice as large as the minimum number of storage drives required to provide RAID data protection for LUN 144.

Figure 3:
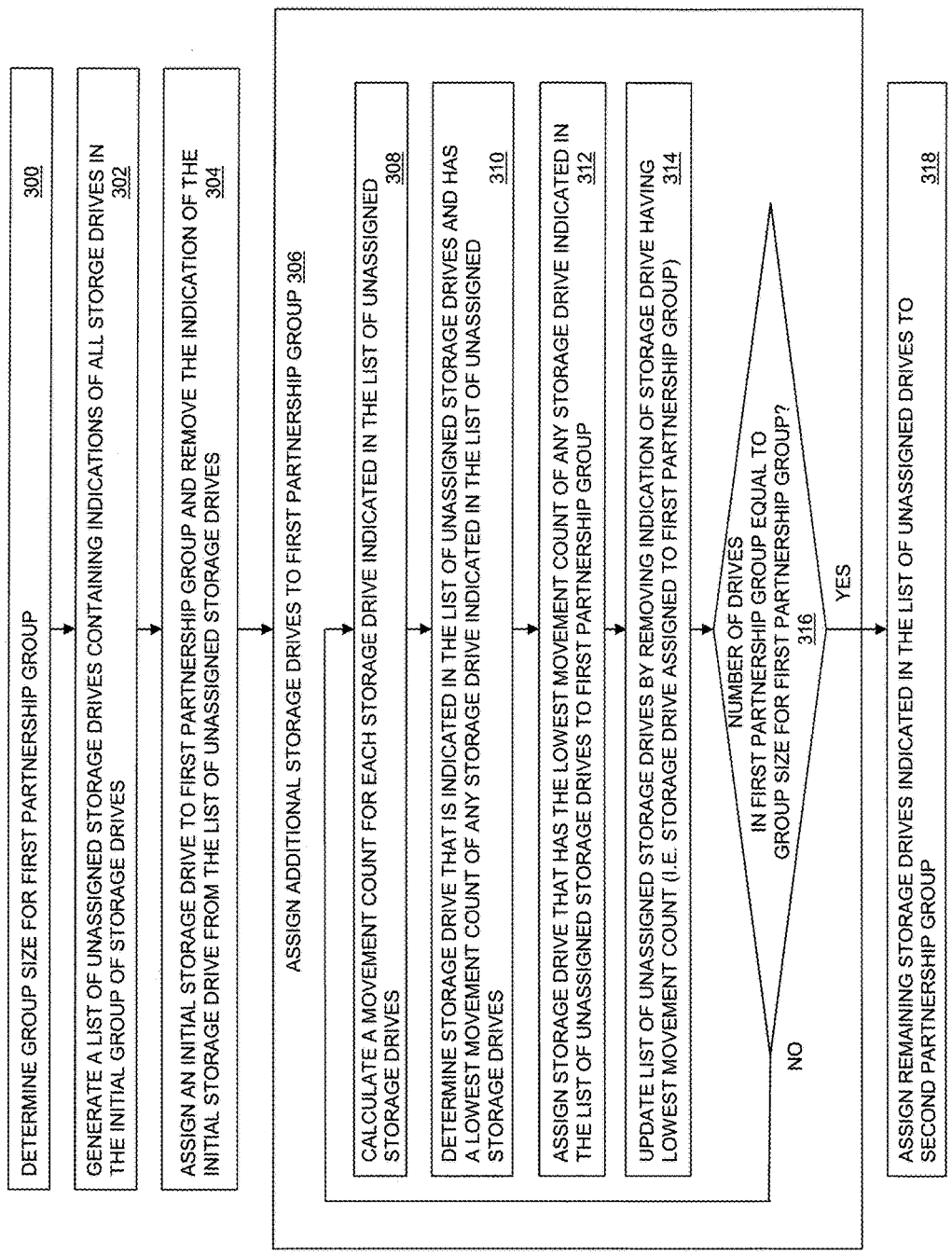
FIG. 3 is a flow chart showing an example of steps performed in some embodiments to assign storage drives to a first partnership group and a second partnership group.

FIG. 3 is a flow chart showing an example of steps performed in some embodiments to split an initial group of storage drives into multiple partnership groups, by assigning storage drives from the initial group of storage drives to a first partnership group and a second partnership group. At step 300, a group size is determined for the first partnership group. For example, the group size for the first partnership group may be calculated as one half of the number storage drives contained in the initial group of storage drives.

At step 302, a list of unassigned storage drives is generated. The list of unassigned storage drives generated at step 302 may, for example, be generated by storing names of all the storage drives contained in the initial group of storage drives into the list of unassigned storage drives.

At step 304, an initial storage drive is assigned to the first partnership group, and the name of the initial storage drive assigned to the first partnership group is removed from the list of unassigned storage drives. For example, a storage drive having a lowest drive number or connected to a lowest number slot in the data storage system may be assigned to the first partnership group, and the name of that storage drive removed from the list of unassigned storage drives.

At step 306, multiple individual additional drives are assigned to the first partnership group by repeating steps 308, 310, 312, 314 and 316 until a total number of storage drives assigned to the first partnership group reaches the group size for the first partnership group determined at step 300.

At step 308, a movement count is calculated storage drive indicated in the list of unassigned storage drives. The movement count for each storage drive indicated in the list of unassigned storage drives is equal to a number of drive extent allocations that must be changed in the event that the storage drive is added to the first partnership group.

At step 310, a determination is made that identifies a storage drive indicated in the list of unassigned storage drives that has a lowest movement count of all the storage drives indicated in the list of unassigned storage drives. If a set of multiple storage drives, each of which are indicated in the list of unassigned drives, all have the same movement count, and movement count that is lower than the movement counts of all other storage drives indicated in the list of unassigned storage drives, a storage drive with a lowest drive number or slot number within that set of storage drives may be selected at step 310.

At step 312, the storage drive determined in step 310, i.e. the storage drive indicated in the list of unassigned storage drives that has the lowest movement count of all the storage drives indicated in the list of unassigned storage drives, is assigned to the first partnership group.

At step 314, the list of unassigned storage drives is updated by removing, from the list of unassigned storage drives, the indication of the storage drive indicated in the list of unassigned storage drives that has the lowest movement count of all the storage drives indicated in the list of unassigned storage drives. In other words, at step 314, the indication (e.g. name) of the storage drive assigned to the first partnership group at step 312 is removed from the list of unassigned storage drives.

At step 316, a total number of storage drives assigned to the first partnership group is compared to the group size for the first partnership group determined at step 300. If the total number of storage drives assigned to the first partnership group is equal to the group size for the first partnership group, then step 316 is followed by step 318. Otherwise, step 316 is followed by step 308.

At step 318, those storage drives that are indicated by the list of unassigned storage drives after the additional storage drives were assigned to the first partnership group in step 306 are assigned to the second partnership group.

Figure 4:
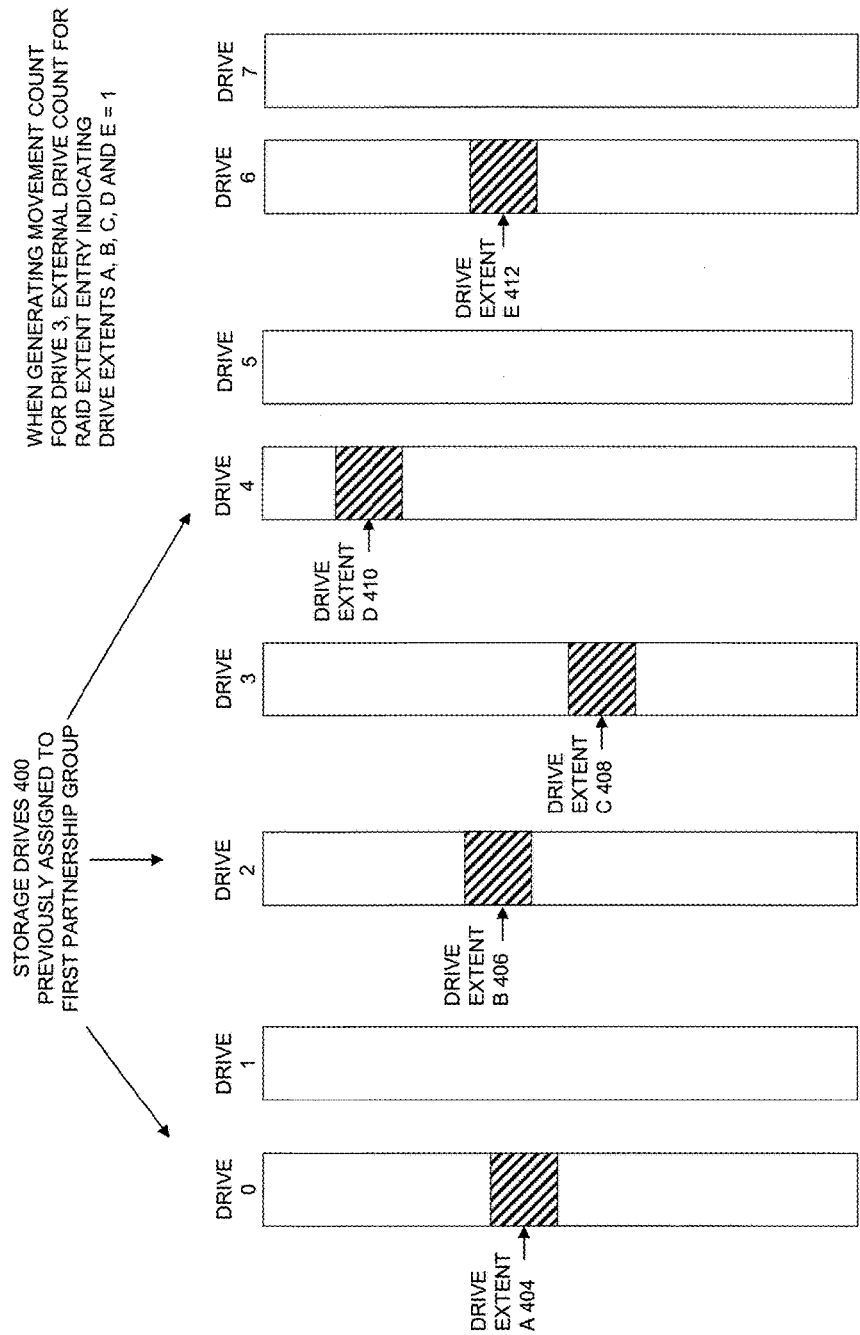
FIG. 4 is a block diagram showing an example of how an external drive count is calculated for a RAID extent entry in some embodiments.

FIG. 4 is a block diagram showing an example of how an external drive count may be calculated for a RAID extent entry in some embodiments. In some embodiments, calculating the movement count for each storage drive indicated in the list of unassigned storage drives is performed by first identifying all RAID extent entries in the RAID mapping table that indicate a drive extent that is located in the storage drive, then generating, for each RAID extent entry in the RAID mapping table that indicates a drive extent that is located in the storage drive, an external drive count that is equal to a total number of disk extents indicated by that RAID extent entry that are not located in either a) the storage drive, or b) a storage drive previously assigned to the first partnership group, and then generating the movement count for the storage drive by summing the external drive counts for all the RAID extent entries in the RAID mapping table that indicate a drive extent that is located in the storage drive.

In the example of FIG. 4, Drive 3 is an example of a storage drive that is indicated in the list of unassigned storage drives, and for which a movement count is being calculated. Storage Drives 400 have been previously assigned to the first partnership group, and consist of Drive 0, Drive 2, and Drive 4. In order to calculate the movement count for Drive 3, all RAID extent entries in the RAID mapping table are identified that indicate a drive extent that is located in Drive 3. For example, the RAID extent entries in the RAID mapping table that indicate a drive extent that is located in Drive 3 include a RAID extent entry that indicates Drive Extent C 408 that is located in Drive 3. The RAID extent entry that indicates Drive Extent C 408 also indicates Drive Extent A 404 located in Drive 0, Drive Extent B 406 located in Drive 2, Drive Extent D 410 that is located in Drive 4, and Drive Extent E 412 that is located in Drive 6. To find the external drive count for the RAID extent entry that indicates Drive Extent C 408 in Drive 3, a total number of disk extents indicated by that RAID extent entry are counted that are not located in either a) Drive 3, orb) a storage drive previously assigned to the first partnership group, e.g. any one of Drive 0, Drive 2, or Drive 4. In the example of FIG. 4, for the RAID extent entry that indicates Drive Extent C 408 in Drive 3, only one of the drive extents indicated by that RAID extent entry is not located in either Drive 3, Drive 0, Drive 2 or Drive 4, i.e. Drive Extent E 412, which is located in Drive 6. Accordingly, the external drive count for the RAID extent entry that indicates Drive Extent C 408 on Drive 3 is equal to one. An external drive count is generated in the same way for each of the other RAID extent entries within the RAID mapping table that indicate other drive extents that are located in Drive 3. All those external drive counts are then added together, and the resulting sum is the movement count for Drive 3. In this way a movement count can similarly be generated for each storage drive indicated in the list of unassigned storage drives.

Figure 5:
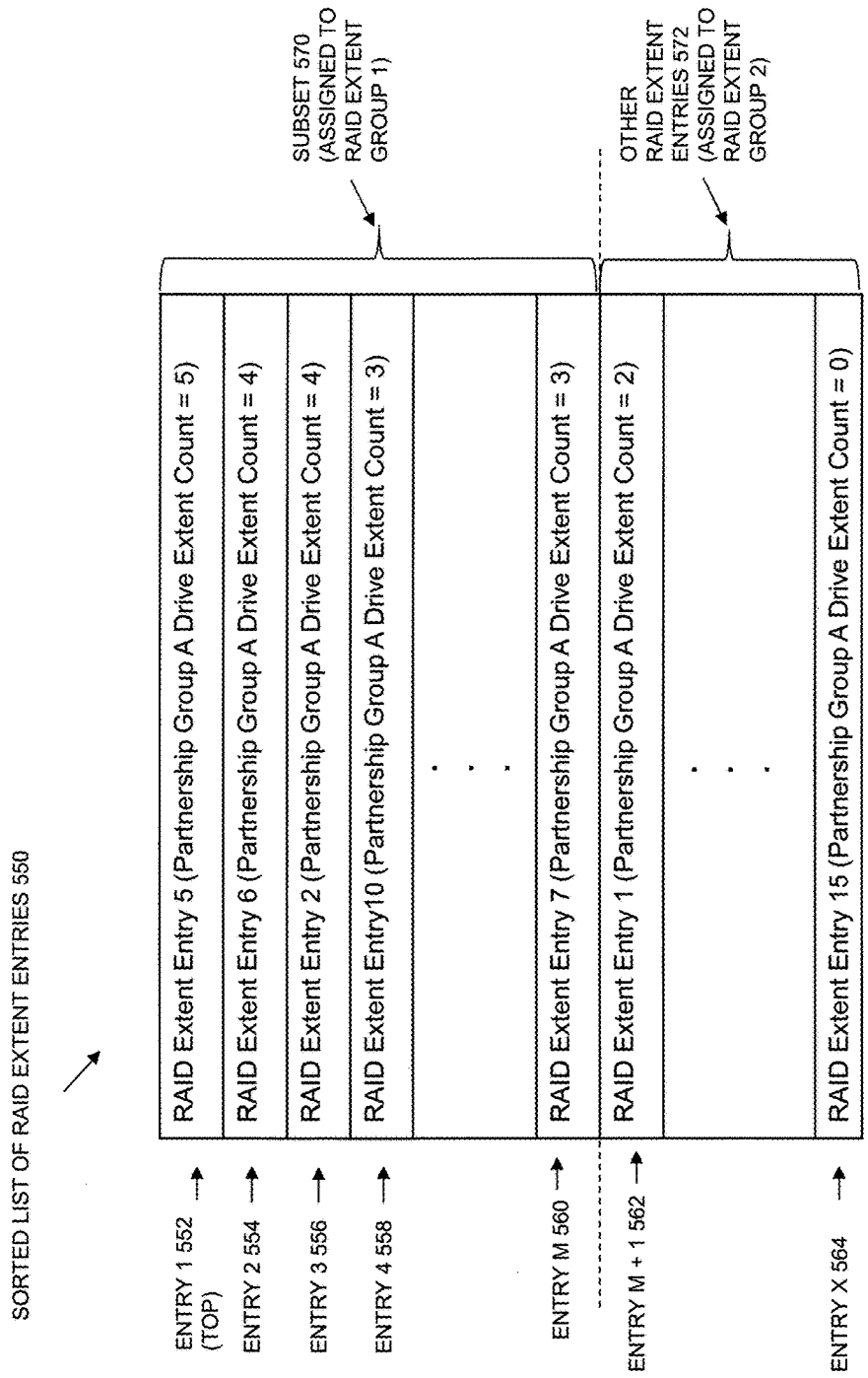
FIG. 5 is a block diagram showing an example of a sorted list of RAID extents generated in some embodiments to assign RAID extent entries to different RAID extent groups in response to the splitting of an initial group of storage drives into two partnership groups.

FIG. 5 is a block diagram showing an example of a Sorted List of RAID Extent Entries 550 generated in some embodiments to assign RAID extent entries to different RAID extent groups in response when splitting an initial group of storage drives into two partnership groups. The Sorted List of RAID Extent Entries 550 is an example of the Sorted List of RAID Extent Entries 157 shown in FIG. 1, and may be generated by Drive Group Splitting Logic 156 by sorting the RAID extent entries in RAID Mapping Table 138 in descending order of corresponding partnership group drive extent count. For example, the partnership group drive extent count for each RAID extent entry may be equal to the number of drive extents indicated by that RAID extent entry that are located in storage drives contained in a first one of the two partnership groups, e.g. in Partnership Group A 200. For example, Entry 1 552 at the top of Sorted List of RAID Extent Entries 550 is RAID extent entry 5 from RAID Mapping Table 138, which has a partnership group drive extent count for Partnership Group A 200 of 5, meaning that RAID extent entry 5 in RAID Mapping Table 138 (e.g. the fifth RAID extent entry in RAID Mapping Table 138) indicates 5 drive extents that are located in storage drives that are contained in Partnership Group A 200. Entry 2 554 is RAID extent entry 6, which has a partnership group drive extent count for Partnership Group A 200 of 4, meaning that RAID extent entry 6 in RAID Mapping Table 138 indicates 4 drive extents that are located in storage drives that are contained in Partnership Group A 200. Entry 3 556 is RAID extent entry 2, which has a partnership group drive extent count for Partnership Group A 200 of 4, meaning that RAID extent entry 2 in RAID Mapping Table 138 indicates 4 drive extents that are located in storage drives that are contained in Partnership Group A 200. Entry 4 558 contains RAID extent entry 10, which has a partnership group drive extent count for Partnership Group A 200 of 3, meaning that RAID extent entry 10 in RAID Mapping Table 138 indicates 3 drive extents that are located in storage drives that are contained in Partnership Group A 200. The entries in Sorted List of RAID Extent Entries 550 continue in descending order of partnership group drive extent count for Partnership Group A 200 through Entry M 560, which has a partnership group drive extent count for Partnership Group A 200 of 3, meaning that RAID extent entry 7 in RAID Mapping Table 138 indicates 3 drive extents that are located in storage drives that are contained in Partnership Group A 200. The entries from Entry 1 552 through Entry M 560 make up a Subset 570 of entries that are located at the top of the Sorted List of RAID Extent Entries 550. The number of entries in Subset 570 is "M", where "M" is equal to a total number of RAID extent entries to be assigned to the RAID Extent Group 1 212, which corresponds to Partnership Group A 200. The Subset 570 is accordingly assigned to RAID Extent Group 1 212. Other RAID Extent Entries 572 includes all RAID extent entries in RAID Mapping Table 138 other than the RAID extent entries contained in Subset 570, e.g. Entry M+1 562 that is RAID extent entry 1, which has a partnership group drive extent count for Partnership Group A 200 of 2, meaning that RAID extent entry 1 in RAID Mapping Table 138 indicates 2 drive extents that are located on storage drives that are contained in Partnership Group A 200, through Entry X 564 that is RAID Extent Entry 15, which has a partnership group drive extent count for Partnership Group A 200 of 0, meaning that RAID extent entry 15 in RAID Mapping Table 138 indicates 0 drive extents that are located on the storage drives contained in Partnership Group A 200. Other RAID Extent Entries 572 are accordingly assigned to RAID Extent Group 2 214.

FIG. 6 is a block diagram showing an example of a Partnership Group Neighborhood Matrix 600 ("NM") generated by Drive Group Splitting Logic 156 in some embodiments. Partnership Group Neighborhood Matrix 600 is an example of the structure of Neighborhood Matrix A 159 and/or Neighborhood Matrix B 161 in FIG. 1. Each element in Partnership Group Neighborhood Matrix 600 may be designated by NM(i,j), where i indicates a first one of the storage drives in a corresponding partnership group, and j indicates a second one of the storage drives in the corresponding partnership group. For example, Partnership Group Neighborhood Matrix 600 may correspond to a destination partnership group, and each element in Partnership Group Neighborhood Matrix 600 may correspond to a pair of storage drives contained in that destination partnership group, and store a value equal to a total number of RAID extent entries in the RAID extent group corresponding to the destination partnership group that indicate both i) at least one drive extent located in a first one of the storage drives in the pair of storage drives corresponding to the element, and ii) at least one drive extent located in a second one of the storage drives in the pair of drives corresponding to the element.

In an operational example in which Partnership Group A 200 is selected as the destination partnership group (see step 704 in FIG. 7), Partnership Group Neighborhood Matrix 600 may be an illustrative example of Neighborhood Matrix A 159. In such an operational example, the value of each element NM(i,j) in Neighborhood Matrix 600 is equal to the total number of RAID extent entries in RAID Extent Group 1 212 that indicate both at least one drive extent located in a storage drive i contained within Partnership Group A 200 and at least one drive extent located in a storage drive j contained within Partnership Group A 200, where i and j vary across the values 0, 2, 3, and 4, since the storage drives in Partnership Group A 200 are drives numbered 0, 2, 3, and 4. In this way, each element in NM(i,j) indicates how many times storage drive i is a "neighbor" to storage drive j within a RAID extent. It should be recognized that the Partnership Group Neighborhood Matrix 300 is a symmetric matrix, in that the value of NM(i,j) is equal to the value of NM(j,i), and that the diagonal elements in which i equals j have a value of 0, since a physical data storage drive cannot be a neighbor to itself, and may be set to zero. The values of NM(0,0), NM(2,2), NM(3,3), and NM(4,4) are accordingly zero.

Further in the operational example in which Partnership Group A 200 is selected as the destination partnership group, the value of NM(2,0) (and the value of NM(0,2)) is equal to the total number of RAID extent entries in RAID Extent Group 1 212 that indicate both at least one drive extent located in drive 2 and at least one drive extent located in drive 0. The value of NM(3,0) (and the value of NM(0,3)) is equal to the total number of RAID extent entries in RAID Extent Group 1 212 that indicate both at least one drive extent located in drive 3 and at least one drive extent located in drive 0. The value of NM(4,0) (and the value of NM(0,4)) is equal to the total number of RAID extent entries in RAID Extent Group 1 212 that indicate both at least one drive extent located in drive 4 and at least one drive extent located in drive 0. The value of NM(3,2) (and the value of NM(2,3)) is equal to the total number of RAID extent entries in RAID Extent Group 1 212 that indicate both at least one drive extent located in drive 3 and at least one drive extent located in drive 2. The value of NM(4,2) (and the value of NM(2,4)) is equal to the total number of RAID extent entries in RAID Extent Group 1 212 that indicate both at least one drive extent located in drive 4 and at least one drive extent located in drive 2. The value of NM(4,3) (and the value of NM(3,4)) is equal to the total number of RAID extent entries in RAID Extent Group 1 212 that indicate both at least one drive extent located in drive 4 and at least one drive extent located in drive 3.

While in the above operational example Partnership Group A 200 is selected as the destination partnership group, those skilled in the art will recognize that Partnership Group Neighborhood Matrix 300 may also illustrate the structure Neighborhood Matrix B 161, e.g. in an operational example in which Partnership Group B 202 is selected as the destination partnership group, albeit with regard to indicating "neighbor" relations among storage drives 1, 5, 6, and 7 instead of among storage drives 0, 2, 3, and 4.

Figure 7:
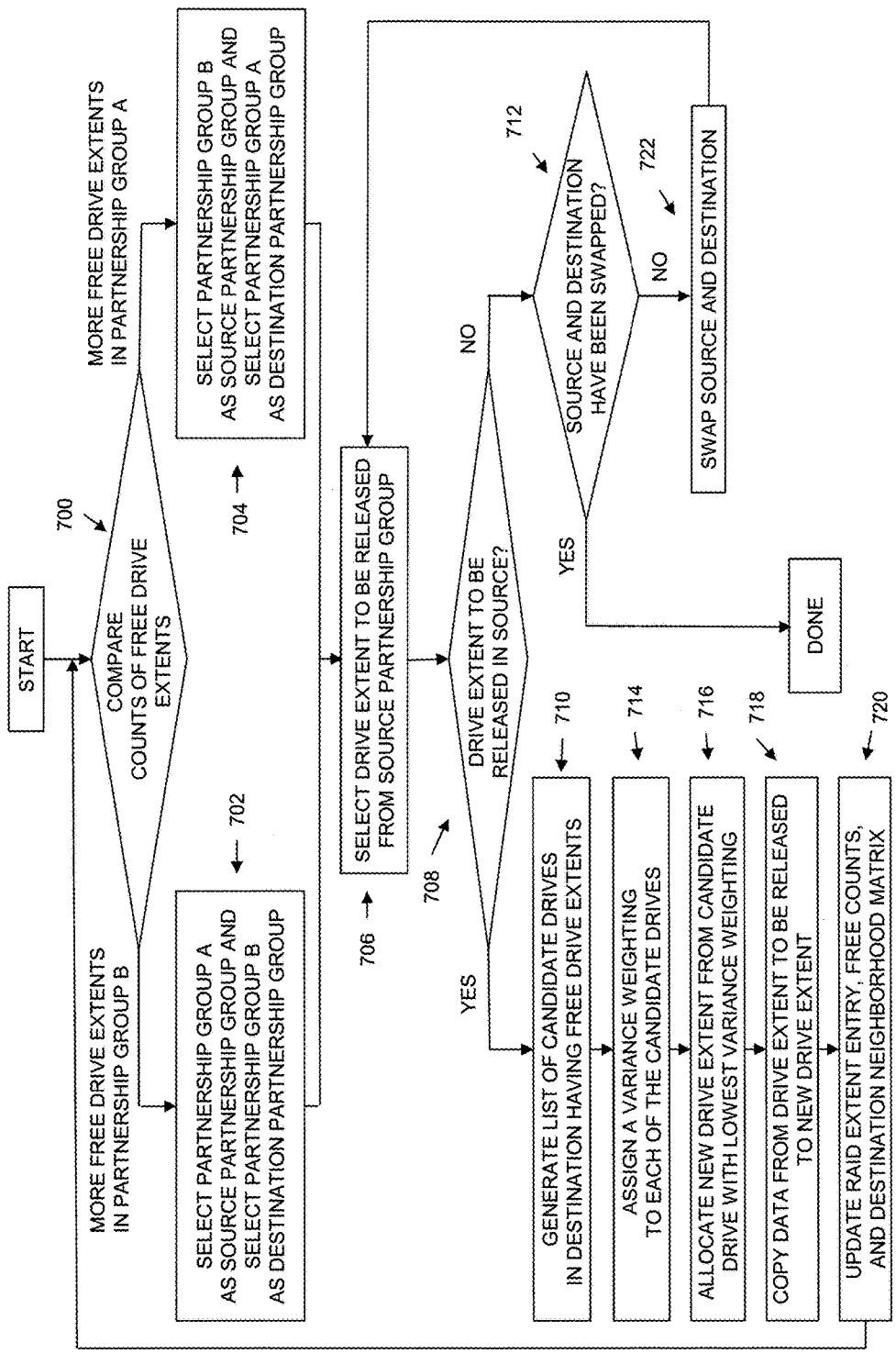
FIG. 7 is a flow chart showing steps performed in some embodiments to modify at least one drive extent indication in at least one RAID extent entry to reflect the splitting of an initial group of storage drives into a first partnership group and a second partnership group.

FIG. 7 is a flow chart showing steps performed in some embodiments to modify at least one drive extent indication in at least one RAID extent entry when splitting an initial group of physical data storage drives into a first partnership group and a second partnership group. The steps of FIG. 7 may, for example, be performed by the Drive Group Splitting Logic 156 shown in FIG. 1. At 700, the number of free (i.e. unallocated) drive extents in Partnership Group A 200 is compared to the number of free drive extents in Partnership Group B 202. In response to detecting that the number of free drive extents in Partnership Group A 200 exceeds the number of free drive extents in Partnership Group B 202, step 700 is followed by step 704, in which Partnership Group B 202 is selected as the source partnership group, and Partnership Group A 200 is selected as the destination partnership group. Alternatively, in response to detecting that the number of free drive extents in Partnership Group B 202 exceeds the number of free drive extents in Partnership Group A 200, step 700 is followed by step 702, in which Partnership Group A 200 is selected as the source partnership group, and Partnership Group B 202 is selected as the destination partnership group. Both step 702 and step 704 are followed by step 706.

In step 706, a drive extent to be released is selected from the source partnership group. The drive extent to be released is a drive extent located on a storage drive contained in the source partnership group, and that is indicated by a RAID extent entry that is assigned to the RAID extent group corresponding to the destination partnership group. If at step 708 a determination is made that there is no drive extent to be released in the source partnership group, i.e. that all drive extents located on the physical data storage drives contained in the source partnership group are indicated by RAID extent entries assigned to the RAID extent group corresponding to the source partnership group, then step 708 is followed by step 712, in which a determination is made as to whether the source partnership group and destination partnership group were previously swapped at step 722. If the source partnership group and the destination partnership group were previously swapped at step 722 in a preceding iteration of the steps shown in FIG. 7, then there are no further drive extents to be released in either the source partnership group or the destination partnership group, and the process of modifying RAID extent entries while splitting of the initial physical storage drive group into the two partnership groups is complete.

Otherwise, if at step 712 it is determined that the source partnership group and the destination partnership group were not previously swapped at step 722, then step 712 is followed by step 722, in which the destination partnership group is selected as a new source partnership group, and the source partnership group is selected as a new destination partnership group. Step 722 is followed by step 706.

If at step 708 a determination is made that there is a drive extent to be released in the source partnership group, then step 708 is followed by step 710. At step 710, a list of candidate drives is generated. The list of candidate drives consists of those drives in the destination partnership group that each have located on them at least one free drive extent. At step 414, a variance weighting is assigned to each candidate drive in the list of candidate drives. The variance weighting for a given one of the candidate drives is calculated as the variance of the values in the neighborhood matrix corresponding to the destination partnership group, as modified to reflect an allocation of a new drive extent from that candidate drive to replace the drive extent to be released. For example, in an operational example in which Partnership Group A 200 is selected as the destination partnership group, and physical data storage drives 0 and 2 each have located thereon at least one free drive extent, the candidate list would include physical data storage drives 0 and 2. The variance weighting for physical data storage drive 0 would be equal to the variance of the values of the elements in Neighborhood Matrix A 159, albeit modified to reflect replacement of the drive extent to be released in RAID Extent Group 1 212 by a new drive extent allocated from physical data storage drive 0. Similarly, the variance weighting for physical data storage drive 2 would be equal to the variance of the values of the elements in Neighborhood Matrix A 159, albeit alternatively modified to reflect replacement of the drive extent to be released in RAID Extent Group 1 212 by a new drive extent allocated from physical data storage drive 2.

The variance of the elements in the neighborhood matrix corresponding to the destination partnership group may be calculated using conventional techniques for calculating a variance. For example, for a neighborhood matrix corresponding to a destination partnership group that has a total of N+1 storage drives, variance across the values of the neighborhood matrix may be calculated as follows:

$$\overline{NM} = \left(\sum_{\substack{i=0\\j=0}}^{N} NM(i, j)\right) / N^2$$

$$\text{variance} = \left(\sum_{\substack{i=0\\j=0}}^{N} (NM(i, j) - \overline{NM})^2\right) / N^2$$

At step 716 a new drive extent is allocated from the storage drive in the candidate list having the lowest variance weighting. At step 718 the data from the drive extent to be released is copied to the new drive extent. At step 720, the indication of the drive extent to be released is changed to an indication of the new drive extent in the RAID extent entry in the RAID extent group corresponding to the destination partnership group that previously indicated the drive extent to be released. Further at step 720, the free drive extent count for the destination partnership group is decremented, and the free drive extent count for the source partnership group is incremented. The neighborhood matrix for the destination partnership group is also modified to reflect the change of the indication of the drive extent to be released to the indication of the new drive extent in the RAID extent entry in the RAID extent group corresponding to the destination partnership group that previously indicated the drive extent to be released.

Figure 8:
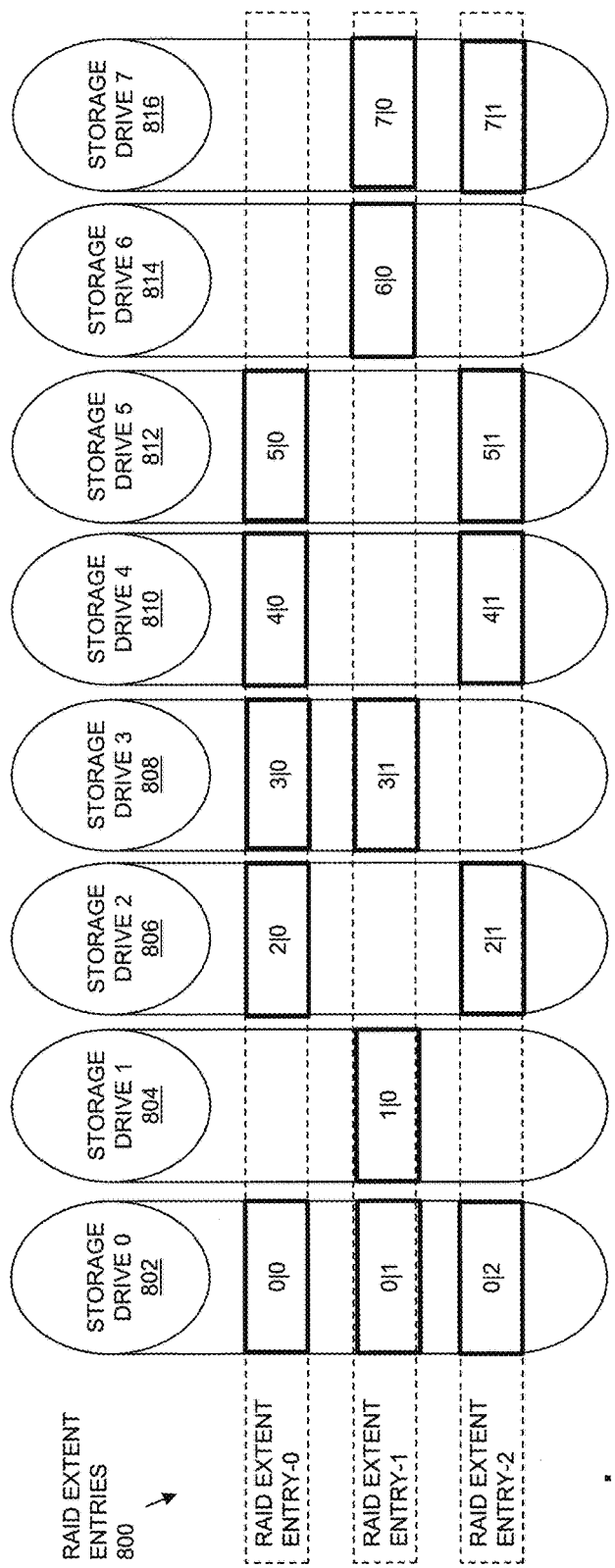
FIG. 8 is a block diagram showing an example of RAID extent entries in a RAID mapping table.

FIG. 8 is a block diagram showing an illustrative example of RAID Extent Entries 800, as may be contained in the RAID Mapping Table 138 in embodiments that provide 4D+1P RAID-5 striping and data protection. As shown in the example of FIG. 8, RAID Extent Entries 800 include a first RAID Extent Entry-0, a second RAID Extent Entry-1, a third RAID Extent Entry-2, and so on for some total number of RAID extent entries. In order to provide 4D+1P RAID-5, each RAID extent entry in RAID Extents 600 indicates five drive extents.

RAID Extent Entry-0 indicates a first drive extent 0|0, which is the first drive extent in Storage Drive 0 802, a second drive extent 2|0, which is the first drive extent in Storage Drive 2 806, a third drive extent 3|0, which is the first drive extent in Storage Drive 3 808, a fourth drive extent 4|0, which is the first drive extent in Storage Drive 4 810, and a fifth drive extent 5|0, which is the first drive extent in Storage Drive 5 812.

RAID Extent Entry-1 indicates a first drive extent 0|1, which is the second drive extent in Storage Drive 0 802, a second drive extent 1|0, which is the first drive extent in Storage Drive 1 804, a third drive extent 3|1, which is the second drive extent in Physical Drive 3 608, a fourth drive extent 6|0, which is the first drive extent in Storage Drive 6 814, and a fifth drive extent 7|0, which is the first drive extent in Storage Drive 7 816.

RAID Extent Entry-2 indicates a first drive extent 0|2, which is the third drive extent in Storage Drive 0 802, a second drive extent 2|1, which is the second drive extent in Storage Drive 2 806, a third drive extent 4|1, which is the second drive extent in Storage Drive 4 810, a fourth drive extent 5|1, which is the second drive extent in Storage Drive 5 812, and a fifth drive extent 7|1, which is the second drive extent in Storage Drive 8 616.

In one example of operation, Storage Drive 0 802 through Storage Drive 7 816 may be part of a larger group of physical data storage drives that is split into two partnership groups, with a first resulting partnership group made up of a set of at least six physical data storage drives that includes Storage Drive 0 802 through Storage Drive 3 808, and a second resulting partnership group made up of a set of at least six physical data storage drives that includes Storage Drive 4 810 through Storage Drive 7 816. For example, RAID Extent Entry-0 and RAID Extent Entry-1 may be assigned to a first RAID extent group corresponding to the first partnership group, and RAID Extent Entry-2 may be assigned to a second RAID extent group corresponding to the second partnership group.

Since the fourth drive extent and the fifth drive extent indicated by RAID Extent Entry-0 are located in storage drives that are contained in the second partnership group, RAID Extent Entry-0 would be modified so that the fourth drive extent and the fifth drive extent indicated by RAID Extent Entry-0 are instead located in the storage drives contained in the first partnership group.

Since the fourth drive extent and the fifth drive extent indicated by RAID Extent Entry-1 are also located in storage drives that are contained in the second partnership group, RAID Extent Entry-1 would also be modified so that the fourth drive extent and the fifth drive extent indicated by RAID Extent Entry-1 are instead located in the storage drives contained in the first partnership group.

Since the first drive extent and the second drive extent indicated by RAID Extent Entry-2 are located in storage drives that are contained in the first partnership group, RAID Extent-2 would be modified so that the first drive extent and the second drive extent indicated by RAID Extent Entry-2 are instead located in the storage drives contained in the second partnership group.

Figure 9:
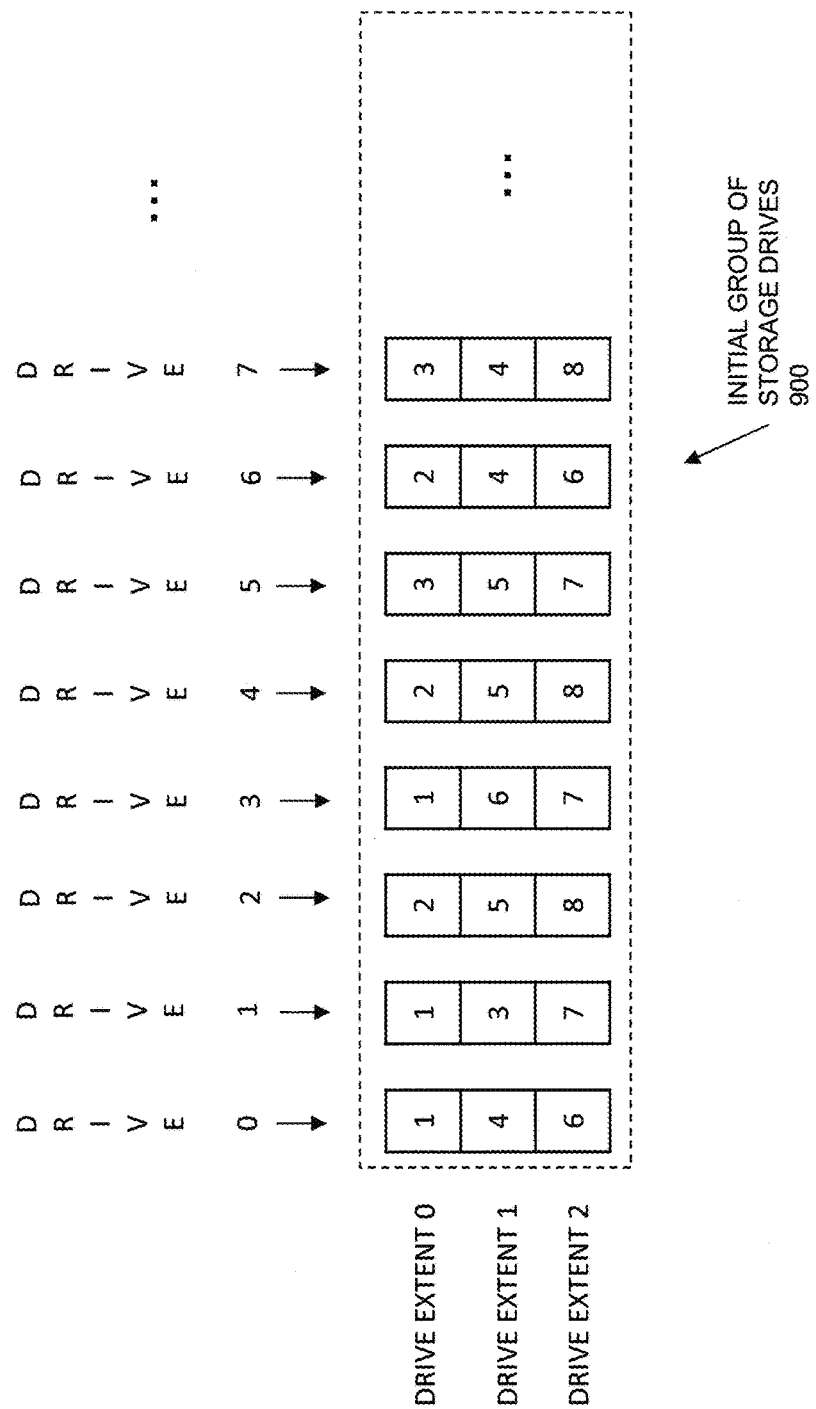
FIG. 9 is a block diagram showing an example of an initial group of storage drives, and shows the indices of the RAID extent entries in the RAID mapping table to which individual drive extents of the storage drives are allocated.

FIG. 9 is a block diagram showing an example of some of the storage drives within an Initial Group of Storage Drives 900, with indications of the indices of the RAID extent entries in the RAID mapping table to which each individual drive extent is allocated. As shown in the block diagram of FIG. 9, Drive Extent 0 of Storage Drive 0 is allocated to RAID extent entry 1, Drive Extent 1 of Storage Drive 0 is allocated to RAID extent entry 4, Drive Extent 2 of Storage Drive 0 is allocated to RAID extent entry 6, Drive Extent 0 of Storage Drive 1 is allocated to RAID extent entry 1, Drive Extent 1 of Storage Drive 1 is allocated to RAID extent entry 3, Drive Extent 2 of Storage Drive 1 is allocated to RAID extent entry 7, Drive Extent 0 of Storage Drive 2 is allocated to RAID extent entry 2, Drive Extent 1 of Storage Drive 2 is allocated to RAID extent entry 5, Drive Extent 2 of Storage Drive 2 is allocated to RAID extent entry 8, Drive Extent 0 of Storage Drive 3 is allocated to RAID extent entry 1, Drive Extent 1 of Storage Drive 3 is allocated to RAID extent entry 6, Drive Extent 2 of Storage Drive 3 is allocated to RAID extent entry 7, Drive Extent 0 of Storage Drive 4 is allocated to RAID extent entry 2, Drive Extent 1 of Storage Drive 4 is allocated to RAID extent entry 5, Drive Extent 2 of Storage Drive 4 is allocated to RAID extent entry 8, Drive Extent 0 of Storage Drive 5 is allocated to RAID extent entry 3, Drive Extent 1 of Storage Drive 5 is allocated to RAID extent entry 5, Drive Extent 2 of Storage Drive 5 is allocated to RAID extent entry 7, Drive Extent 0 of Storage Drive 6 is allocated to RAID extent entry 2, Drive Extent 1 of Storage Drive 6 is allocated to RAID extent entry 4, Drive Extent 2 of Storage Drive 6 is allocated to RAID extent entry 6, Drive Extent 0 of Storage Drive 7 is allocated to RAID extent entry 3, Drive Extent 1 of Storage Drive 7 is allocated to RAID extent entry 4, and Drive Extent 2 of Storage Drive 7 is allocated to RAID extent entry 8.

Figure 10:
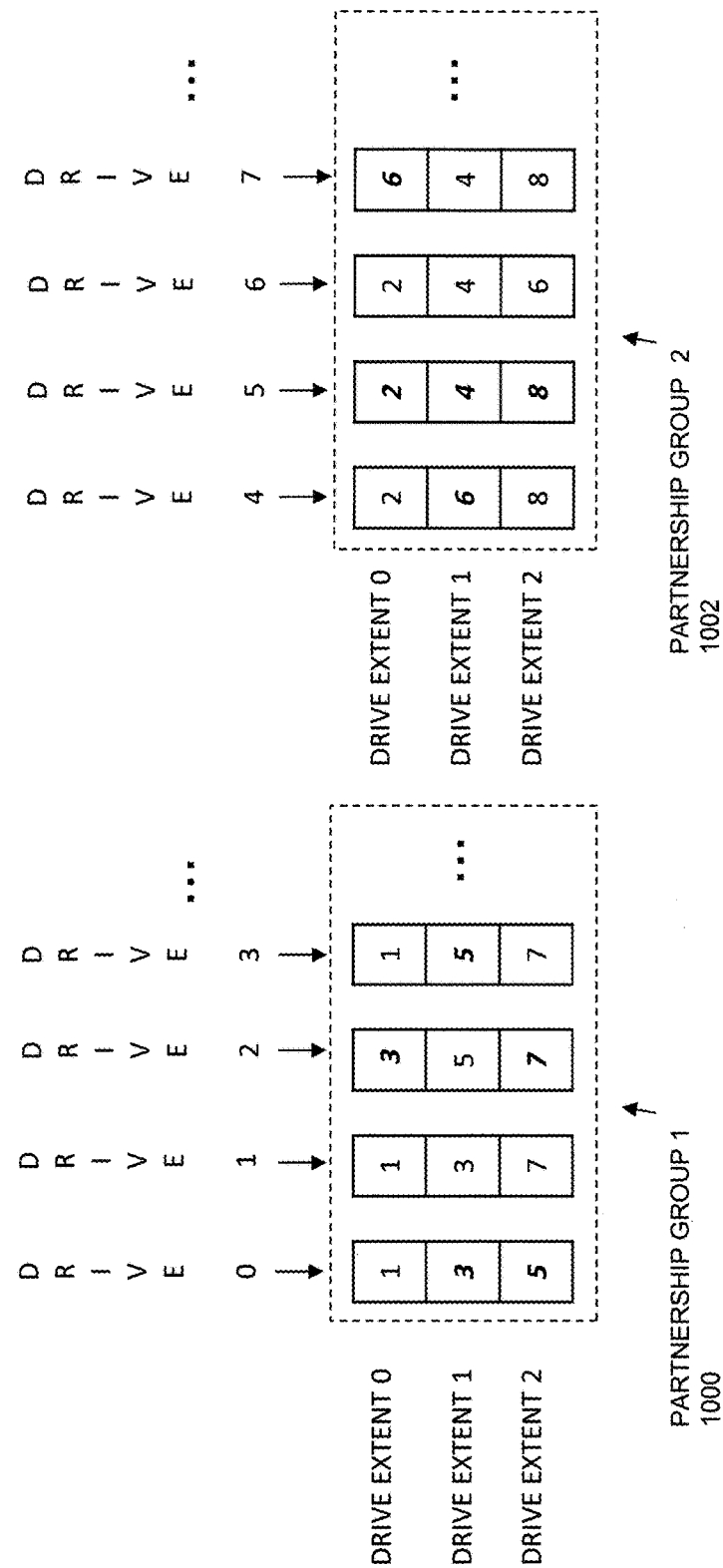
FIG. 10 is a block diagram showing partnership groups generated from the initial group of storage drives shown in FIG. 9, and indicating changes made in the allocations of specific drive extents made to reflect the generated partnership groups.

In an example of operation, Initial Group of Physical Drives 900 is split into two partnership groups, shown in FIG. 10 by Partnership Group 1 1000 and Partnership Group 2 1002. Partnership Group 1 1000 contains a set of storage drives that includes Storage Drive 0, Storage Drive 1, Storage Drive 2, and Storage Drive 3. Partnership Group 2 1002 contains a set of storage drives that includes Storage Drive 4, Storage Drive 5, Storage Drive 6, and Storage Drive 7. Further in an example of operation, the RAID extent entries in the RAID mapping table may be divided into two RAID extent groups, i.e. a first RAID extent group to which RAID extent entries 1, 3, 5, and 7 are assigned, and a second RAID extent group to which RAID extent entries 2, 4, 6, and 8 are assigned. The first RAID extent group corresponds to Partnership Group 1 1000, and the second RAID extent group corresponds to Partnership Group 2 1002. The drive extent allocations that are italicized in FIG. 10 indicate allocation modifications that were performed while splitting the Initial Group of Physical Drives 900 into Partnership Group 1 800 and Partnership Group 2 802.

For example, as shown in FIG. 9, Drive Extent 1 of Storage Drive 0 was allocated to RAID extent entry 4 prior to the split. However, as part of the process of splitting the RAID mapping table into RAID extent groups, RAID extent entry 4 was assigned to the second RAID extent group, which corresponds to Partnership Group 2 1002. Accordingly, as shown in FIG. 10, the allocation of Drive Extent 1 of Storage Drive 0 was modified during the splitting process such that after the split Drive Extent 1 of Storage Drive 0 is allocated to RAID extent entry 3, which is part of the first RAID extent group.

In another example, as shown in FIG. 9, Drive Extent 2 of Storage Drive 0 was allocated to RAID extent entry 6 prior to the split. However, as part of the process of splitting the RAID mapping table into RAID extent groups, RAID extent entry 6 was also assigned to the second RAID extent group, which corresponds to Partnership Group 2 1002. Accordingly, as shown in FIG. 10, the allocation of Drive Extent 2 of Storage Drive 0 is modified during the splitting process such that after the split Drive Extent 2 of Storage Drive 0 is allocated to RAID extent entry 5, which is part of the first RAID extent group.

In another example, as shown in FIG. 9, Drive Extent 0 of Storage Drive 2 was allocated to RAID extent entry 2 prior to the split. However, as part of the process of splitting the RAID mapping table into RAID extent groups, RAID extent entry 2 was assigned to the second RAID extent group, which corresponds to Partnership Group 2 1002. Accordingly, as shown in FIG. 10, the allocation of Drive Extent 0 of Storage Drive 2 is modified during the splitting process such that after the split Drive Extent 0 of Storage Drive 2 is allocated to RAID extent entry 3, which is part of the first RAID extent group.

In another example, as shown in FIG. 9, Drive Extent 2 of Storage Drive 2 was allocated to RAID extent entry 8 prior to the split. However, as part of the process of splitting the RAID mapping table into RAID extent groups, RAID extent entry 8 was assigned to the second RAID extent group, which corresponds to Partnership Group 2 1002. Accordingly, as shown in FIG. 10, the allocation of Drive Extent 2 of Storage Drive 2 is modified during the splitting process such that after the split Drive Extent 2 of Storage Drive 2 is allocated to RAID extent entry 7, which is part of the first RAID extent group.

In another example, as shown in FIG. 9, Drive Extent 1 of Storage Drive 3 was allocated to RAID extent entry 6 prior to the split. However, as part of the process of splitting the RAID mapping table into RAID extent groups, RAID extent entry 6 was assigned to the second RAID extent group, which corresponds to Partnership Group 2 1002. Accordingly, as shown in FIG. 10, the allocation of Drive Extent 1 of Storage Drive 3 is modified during the splitting process such that after the split Drive Extent 1 of Storage Drive 3 is allocated to RAID extent entry 5, which is part of the first RAID extent group.

In another example, as shown in FIG. 9, Drive Extent 1 of Storage Drive 4 was allocated to RAID extent entry 5 prior to the split. However, as part of the process of splitting the RAID mapping table into RAID extent groups, RAID extent entry 5 was assigned to the first RAID extent group, which corresponds to Partnership Group 1 1000. Accordingly, as shown in FIG. 10, the allocation of Drive Extent 1 of Storage Drive 4 is modified during the splitting process such that after the split Drive Extent 1 of Storage Drive 4 is allocated to RAID extent entry 6, which is part of the second RAID extent group.

In another example, as shown in FIG. 9, Drive Extent 0 of Storage Drive 5 was allocated to RAID extent entry 3 prior to the split. However, as part of the process of splitting the RAID mapping table into RAID extent groups, RAID extent entry 3 was assigned to the first RAID extent group, which corresponds to Partnership Group 1 1000. Accordingly, as shown in FIG. 10, the allocation of Drive Extent 0 of Storage Drive 5 is modified during the splitting process such that after the split Drive Extent 0 of Storage Drive 5 is allocated to RAID extent entry 2, which is part of the second RAID extent group.

In another example, as shown in FIG. 9, Drive Extent 1 of Storage Drive 5 was allocated to RAID extent entry 5 prior to the split. However, as part of the process of splitting the RAID mapping table into RAID extent groups, RAID extent entry 5 was assigned to the first RAID extent group, which corresponds to Partnership Group 1 1000. Accordingly, as shown in FIG. 10, the allocation of Drive Extent 1 of Storage Drive 5 is modified during the splitting process such that after the split Drive Extent 1 of Storage Drive 5 is allocated to RAID extent entry 4, which is part of the second RAID extent group.

In another example, as shown in FIG. 9, Drive Extent 2 of Storage Drive 5 was allocated to RAID extent entry 7 prior to the split. However, as part of the process of splitting the RAID mapping table into RAID extent groups, RAID extent entry 7 was assigned to the first RAID extent group, which corresponds to Partnership Group 1 1000. Accordingly, as shown in FIG. 10, the allocation of Drive Extent 2 of Storage Drive 5 is modified during the splitting process such that after the split Drive Extent 2 of Storage Drive 5 is allocated to RAID extent entry 8, which is part of the second RAID extent group.

In another example, as shown in FIG. 9, Drive Extent 0 of Storage Drive 7 was allocated to RAID extent entry 3 prior to the split. However, as part of the process of splitting the RAID mapping table into RAID extent groups, RAID extent entry 3 was assigned to the first RAID extent group, which corresponds to Partnership Group 1 1000. Accordingly, as shown in FIG. 10, the allocation of Drive Extent 0 of Storage Drive 7 is modified during the splitting process such that after the split Drive Extent 0 of Storage Drive 7 is allocated to RAID extent entry 6, which is part of the second RAID extent group.

Figure 11:
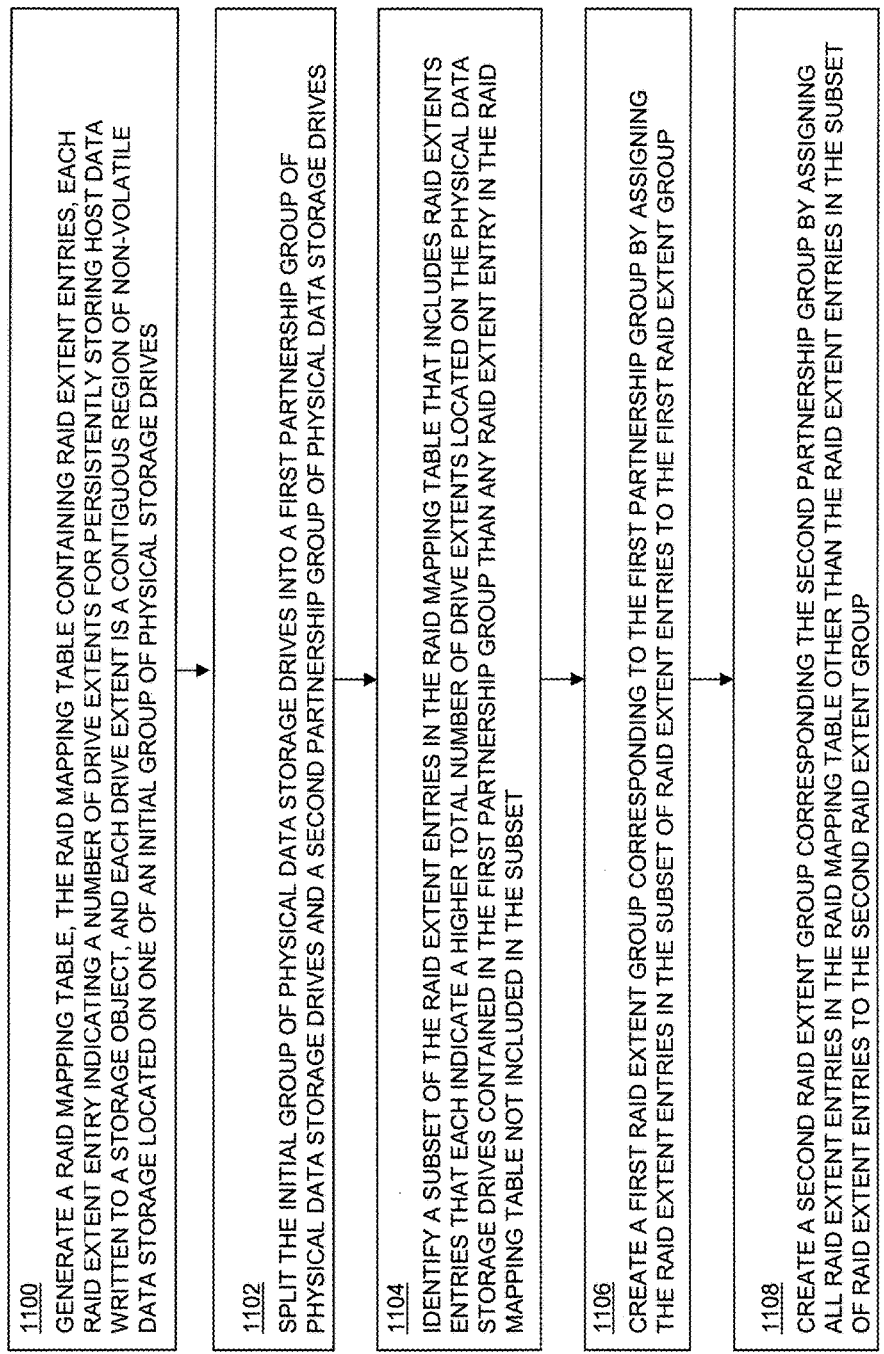
FIG. 11 is a flow chart showing an example of steps performed during operation of some embodiments of the disclosed technology to assign RAID extent entries to different RAID extent groups in response to splitting of an initial set of storage drives into two partnership groups.

FIG. 11 is a flow chart showing an example of steps performed during operation of some embodiments of the disclosed technology to assign RAID extent entries to different RAID extent groups when splitting of an initial set of physical data storage drives into two partnership groups. The steps of FIG. 11 may, for example, be performed by the Drive Group Splitting Logic 156 shown in FIG. 1.

At step 1100, a RAID mapping table is generated that contains RAID extent entries, each RAID extent entry indicating a number of drive extents that are used to persistently store host data written to a storage object. Each drive extent is a contiguous region of non-volatile data storage located on one of an initial group of storage drives.

At step 1102, the initial group of storage drives is split into a first partnership group of storage drives and a second partnership group of storage drives.

At step 1104 a subset of the RAID extent entries in the RAID mapping table is identified. The subset includes RAID extent entries that each indicate a higher total number of drive extents located in the storage devices contained in the first partnership group than any RAID extent entry in the RAID mapping table not included in the subset.

At step 1106 a first RAID extent group is created that corresponds to the first partnership group. The first RAID extent group is created by assigning the RAID extent entries in the subset of RAID extents to the first RAID extent group.

At step 1108, a second RAID extent group is created that corresponds to the second partnership group. The second RAID extent group is created by assigning all RAID extent entries in the RAID mapping table other than the RAID extent entries contained in the subset of RAID extent entries to the second RAID extent group.

Figure 12:
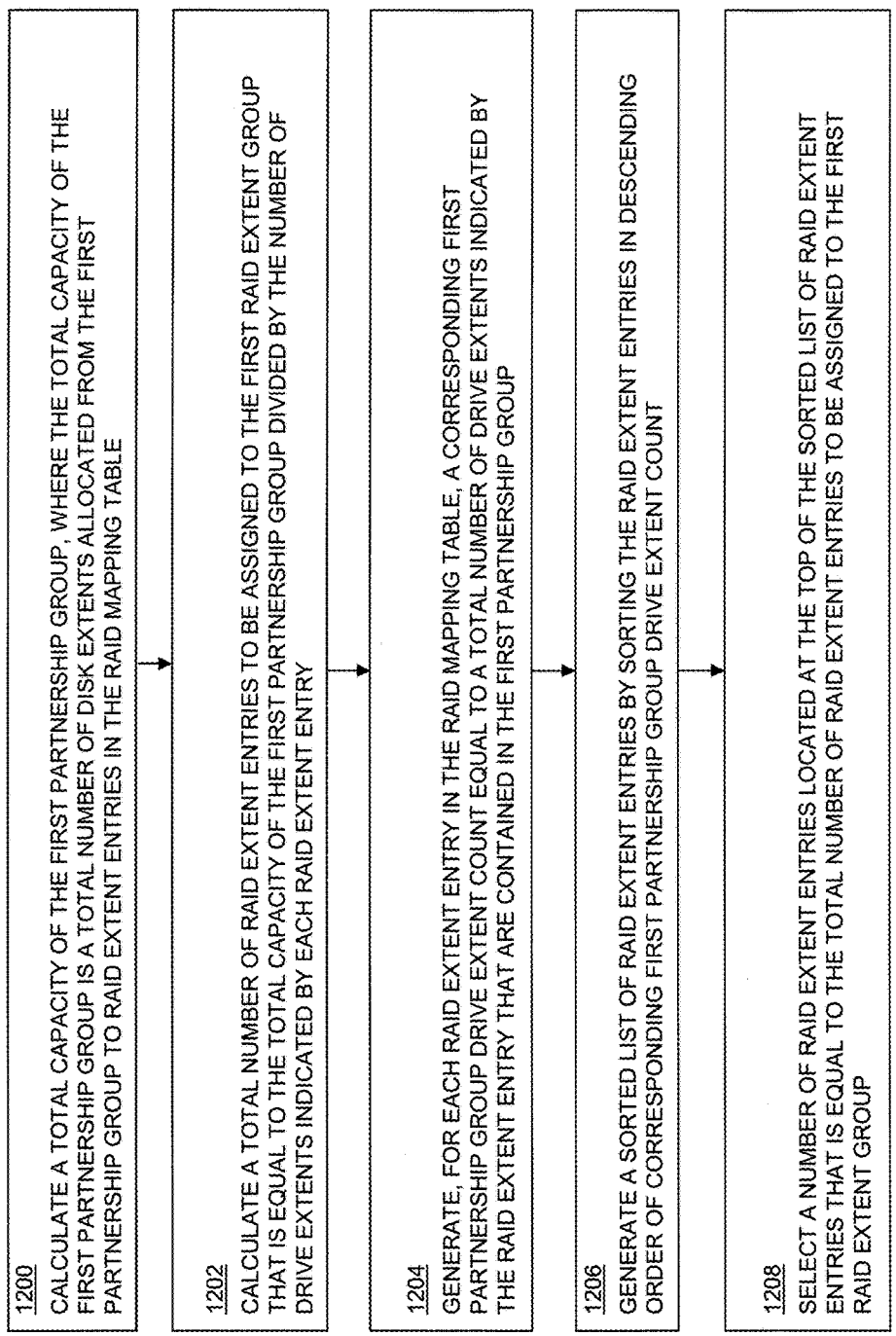
FIG. 12 is a flow chart showing an example of steps performed in some embodiments to identify a subset of the RAID extent entries in the RAID mapping table that includes a number of RAID extent entries that each indicate a higher total number of drive extents located in the physical data storage devices contained in the first partnership group than any RAID extent entry in the RAID mapping table that is not included in the subset.

FIG. 12 is a flow chart showing an example of steps performed in some embodiments to identify a subset of the RAID extent entries in the RAID mapping table that includes a number of RAID extent entries that each indicate a higher total number of drive extents located in the storage devices contained in the first partnership group than any RAID extent entry in the RAID mapping table not included in the subset, as in step 1104 of FIG. 11. The steps of FIG. 12 may, for example, be performed by the Drive Group Splitting Logic 156 shown in FIG. 1.

At step 1200, a total capacity of the first partnership group is calculated. The total capacity of the first partnership group is equal to a total number of disk extents allocated from the first partnership group to RAID extents in the RAID mapping table.

At step 1202, a total number of RAID extent entries that are to be assigned to the first RAID extent group is calculated. The total number of RAID extent entries that are to be assigned to the first RAID extent group is equal to the total capacity of the first partnership group divided by the number of drive extents indicated by each RAID extent entry.

At step 1204, for each RAID extent entry in the RAID mapping table, a corresponding first partnership group drive extent count is generated that is equal to a total number of drive extents indicated by that RAID extent entry that are contained in the first partnership group.

At step 1206, a sorted list of RAID extent entries is generated by sorting the RAID extent entries in descending order of corresponding first partnership group drive extent count.

At step 1208, a number of RAID extent entries are selected that are located at the top of the sorted list of RAID extent entries that is equal to the total number of RAID extent entries to be assigned to the first RAID extent group.

Figure 13:
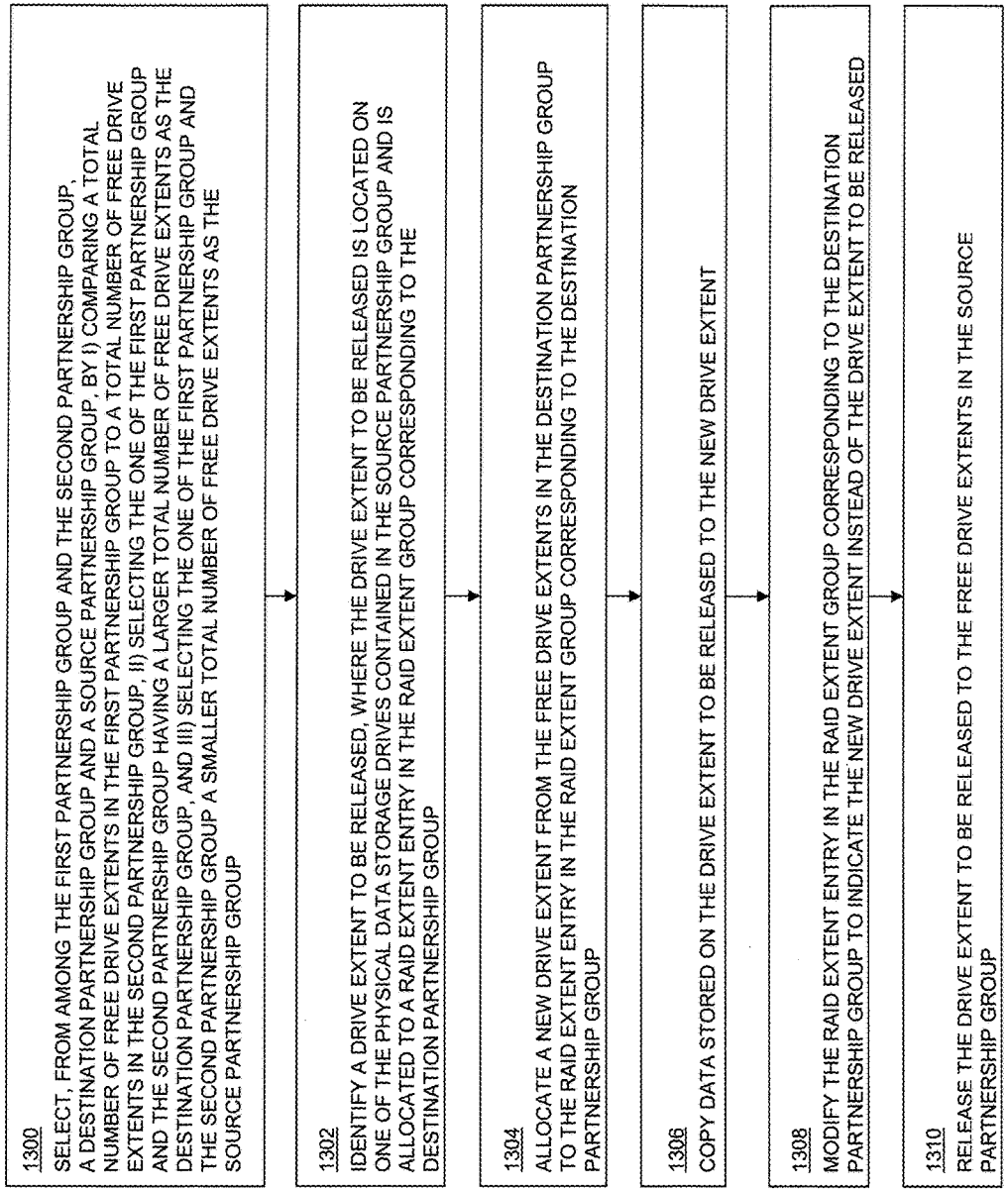
FIG. 13 is a flow chart showing an example of steps performed in some embodiments to modify at least one drive extent indication in at least one of the RAID extent entry to reflect the splitting of an initial group of physical data storage drives into a first partnership group and a second partnership group.

FIG. 13 is a flow chart showing an example of steps performed in some embodiments to modify at least one drive extent indication in at least one of the RAID extent entries to reflect the splitting of an initial group of storage drives into a first partnership group and a second partnership group. The steps of FIG. 13 may, for example be performed by Drive Group Splitting Logic 156 after performing the steps of FIGS. 11 and 12.

At step 1300, a destination partnership group and a source partnership group are selected from among the first partnership group and the second partnership group by i) comparing a total number of free drive extents in the first partnership group to a total number of free drive extents in the second partnership group, ii) selecting the one of the first partnership group and the second partnership group having a larger total number of free drive extents as the destination partnership group, and iii) selecting the one of the first partnership group and the second partnership group having a smaller total number of free drive extents as the source partnership group.

At step 1302 a drive extent to be released is identified. The drive extent that is identified as the drive extent to be released at step 1302 is located in one of the storage drives contained in the source partnership group and is allocated to a RAID extent entry in the RAID extent group corresponding to the destination partnership group.

At step 1304, a new drive extent is allocated from the free drive extents in the destination partnership group to the RAID extent entry in the RAID extent group corresponding to the destination partnership group.

At step 1306, data stored on the drive extent to be released is copied to the new drive extent.

At step 1308, the RAID extent entry in the RAID extent group corresponding to the destination partnership group is modified to indicate the new drive extent instead of the drive extent to be released.

At step 1310, the drive extent to be released is released (i.e. deallocated) and added to the free drive extents in the source partnership group.

Figure 14:
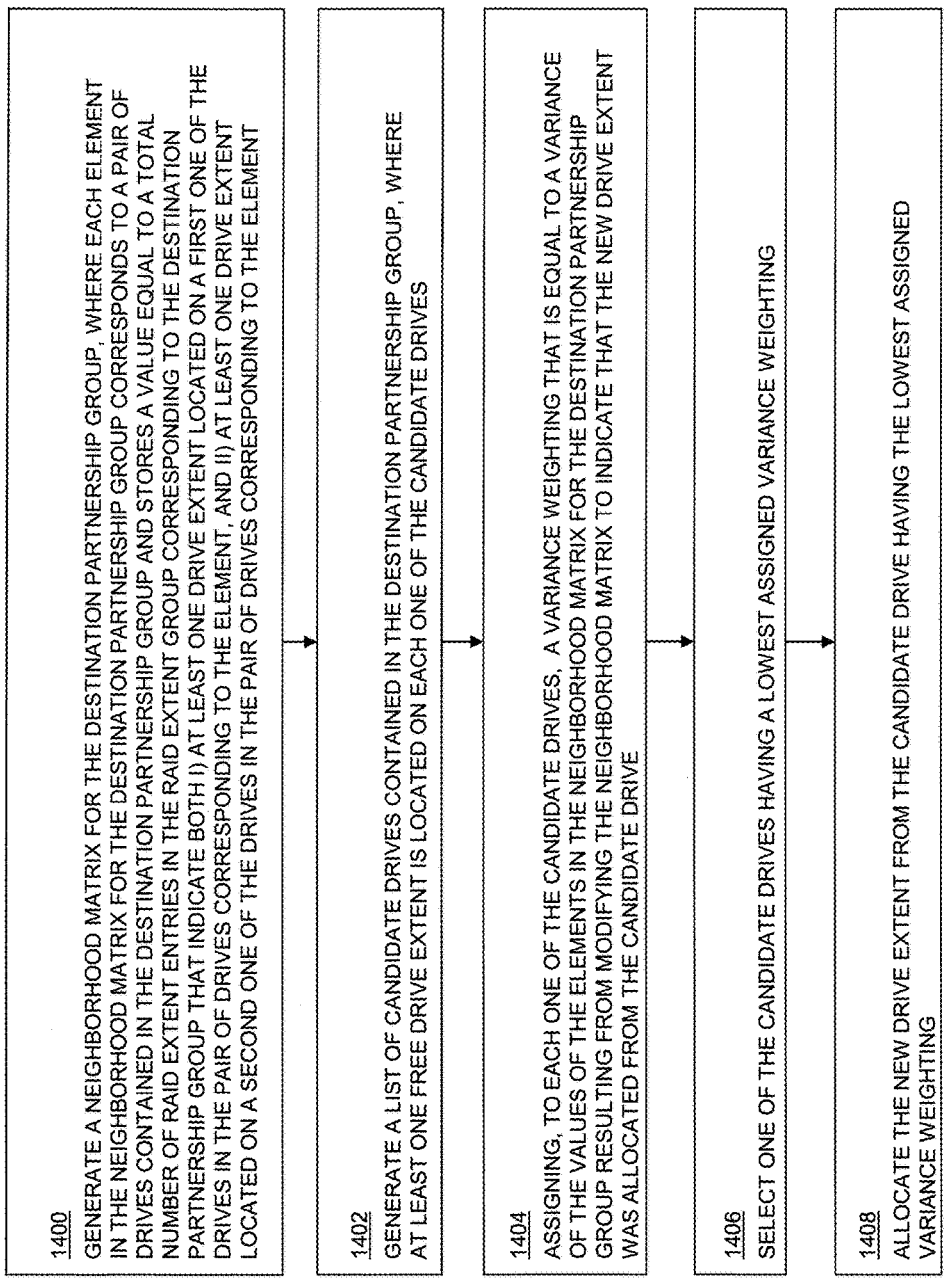
FIG. 14 is a flow chart showing an example of steps performed in some embodiments to allocate a new drive extent from the free drive extents in a destination partnership group.

FIG. 14 is a flow chart showing an example of steps performed in some embodiments to allocate a new drive extent from the free drive extents in a destination partnership group. The steps of FIG. 14 are, for example, performed by the Drive Group Splitting Logic 156 shown in FIG. 1, e.g. as part of performing step 1304 in FIG. 13.

At step 1400, a neighborhood matrix is generated for the destination partnership group. Each element in the neighborhood matrix for the destination partnership group corresponds to a pair of storage drives contained in the destination partnership group, and stores a value equal to a total number of RAID extent entries in the RAID extent group corresponding to the destination partnership group that indicate both i) at least one drive extent located on a first one of the storage drives in the pair of storage drives corresponding to the element, and ii) at least one drive extent located on a second one of the storage drives in the pair of storage drives corresponding to the element.

At step 1402, a list of candidate drives contained in the destination partnership group is generated. Each candidate drive in the list of candidate drives has at least one free drive extent located in it.

At step 1404, a variance weighting is assigned to each one of the candidate drives. The variance weighting assigned to a variance drive is equal to a variance of the values stored in the elements of the neighborhood matrix for the destination partnership group that would result from modifying the neighborhood matrix to indicate that the new drive extent was allocated from that candidate drive.

At step 1406, one of the candidate drives is selected that has the lowest assigned variance weighting.

At step 1408, the new drive extent is allocated from the candidate drive having the lowest assigned variance weighting.

Figure 15:
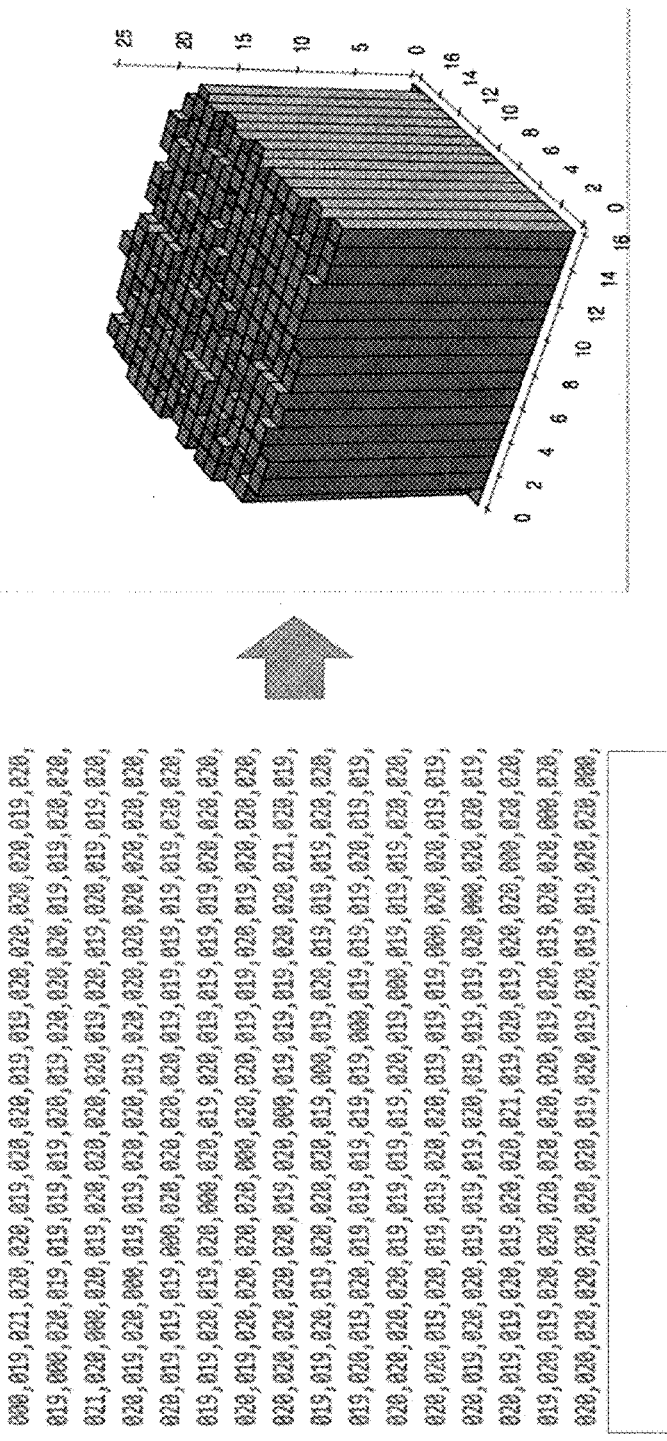
FIG. 15 shows an example of values in a partnership group matrix having a low variance and a graphical representation of those values, as may advantageously be provided using some embodiments of the disclosed techniques.

FIG. 15 shows an example of Values 1500 in the elements of a partnership group neighborhood matrix having a low variance, and a Graphical Representation 1502 of the Values 1500. The partnership group corresponding to the Values 1500 and the Graphical Representation 1502 has, for example, 16 storage drives. The Graphical Representation 1502 illustrates that when the values in the elements of a partnership group neighborhood matrix have a low variance, then the corresponding graphical representation is significantly flat. In some embodiments, while modifying at least one drive extent indication in at least one of the RAID extent entries in a RAID extent group to reflect the splitting of the initial group of storage drives into a first partnership group and a second partnership group, the disclosed techniques allocate at least one new drive extent to replace at least one drive extent located outside of a corresponding partnership group such that a resulting variance in the values of the elements in a neighborhood matrix for the partnership group is kept low, as illustrated in FIG. 15. As a result, some embodiments of the disclosed technology may provide a high level of rebuild performance by ensuring that RAID extent entries are evenly distributed across the drives in the partnership group, so that large numbers of storage drives are able to participate in the drive rebuilding process in the event of a drive failure in the partnership group.

Figure 16:
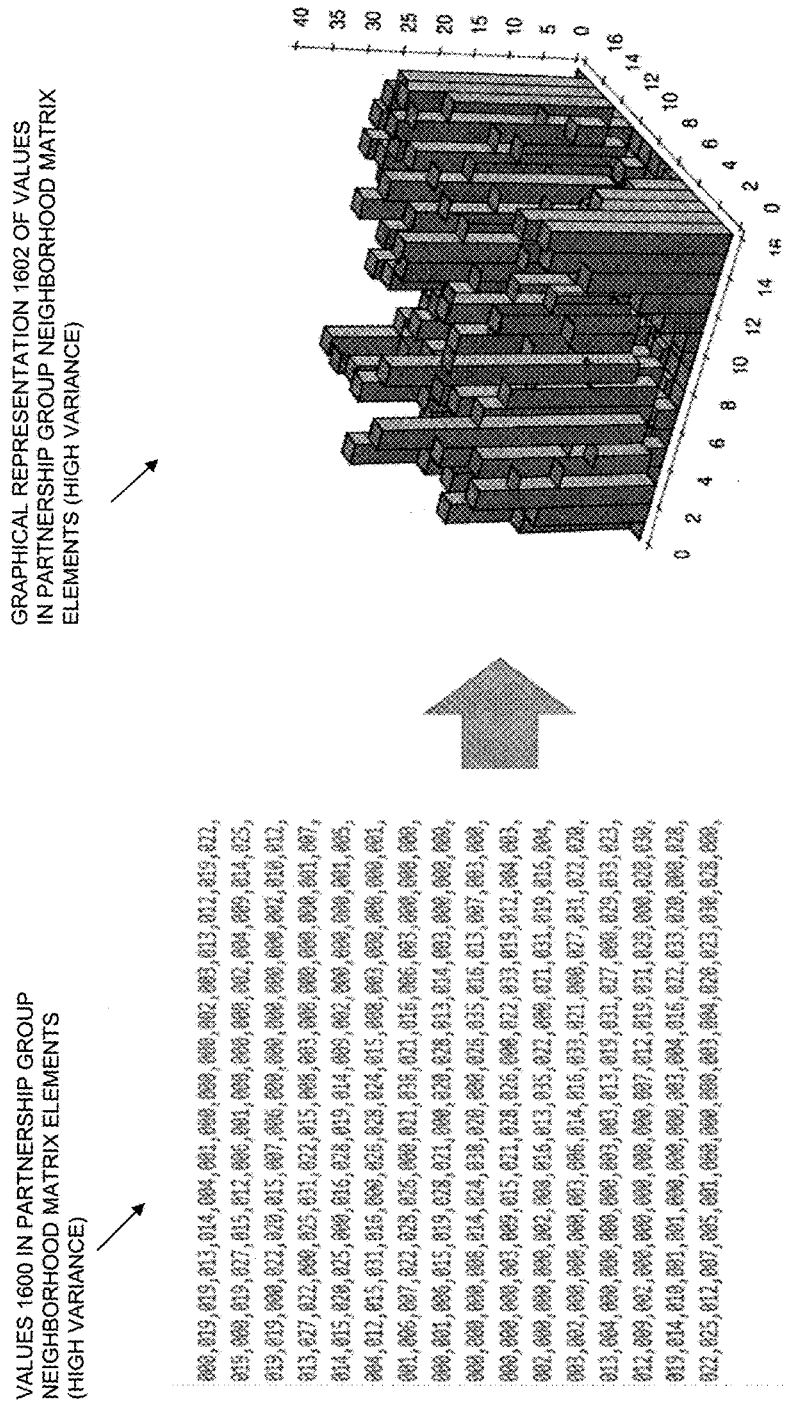
FIG. 16 shows an example of values in a partnership group matrix having a high variance and a graphical representation of those values.

FIG. 16 shows a contrasting example of Values 1600 in the elements of a partnership group neighborhood matrix having a high variance, and a Graphical Representation 1602 of the Values 1600. The partnership group corresponding to the Values 1600 and the Graphical Representation 1602 also has, for example, 16 physical data storage drives. The Graphical Representation 1602 illustrates that when the values in the elements of a partnership group neighborhood matrix have a high variance, then the corresponding graphical representation is significantly not flat. Without using the techniques disclosed herein while modifying at least one drive extent indication in at least one of the RAID extent entries in a RAID extent group to reflect the splitting of the initial group of physical data storage drives into a first partnership group and a second partnership group, new drive extents may be allocated to replace drive extents located outside of a corresponding partnership group such that a resulting variance in the values of the elements in a neighborhood matrix for the partnership group is high, as illustrated in FIG. 16. A low level of rebuild performance may accordingly result because smaller numbers of storage drives are able to participate in the drive rebuilding process in the event of a drive failure in the partnership group.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing RAID (Redundant Array of Independent Disks) data protection for a storage object in a data storage system, wherein the data storage system includes a storage processor and an initial group of storage drives communicably coupled to the storage processor, the method comprising:

generating a RAID mapping table, wherein the RAID mapping table contains a plurality of RAID extent entries, wherein each RAID extent entry indicates a plurality of drive extents that are allocated to the RAID extent entry and that are used to persistently store host data written to a portion of an address space of the storage object corresponding to the RAID extent entry, and wherein each drive extent comprises a contiguous region of non-volatile data storage located on one of the storage drives in the initial group of storage drives;

splitting the initial group of storage drives into a first partnership group and a second partnership group, such that the RAID extent entries to which drive extents located in storage drives contained in the first partnership group are allocated only indicate drive extents located in the storage drives contained in the first partnership group, and such that RAID extent entries to which drive extents located in storage drives contained in the second partnership group are allocated only indicate drive extents located in the storage drives contained in the second partnership group, at least in part by:

i) adding an indication of each storage drive in the initial group of storage drives to a list of unassigned storage drives, ii) assigning an initial storage drive to the first partnership group, wherein assigning the initial storage drive to the first partnership group includes removing the indication of the initial storage drive from the list of unassigned storage drives, iii) assigning a plurality of additional storage drives to the first partnership group, wherein assigning each individual one of the additional storage drives to the first partnership group includes a) determining a movement count for each storage drive indicated in the list of unassigned storage drives, the movement count representing a number of drive extent allocations that must be changed in the event that the storage drive is added to the first partnership group, b) determining a storage drive indicated in the list of unassigned storage drives that has a lowest movement count, c) assigning, to the first partnership group, the storage drive indicated in the list of unassigned storage drives that has the lowest movement count, and d) updating the list of unassigned storage drives by removing, from the list of unassigned storage drives, the indication of the storage drive indicated in the list of unassigned storage drives that has the lowest movement count, and iv) assigning those storage drives indicated in the list of unassigned storage drives after the plurality of additional storage drives has been added to the first partnership group to the second partnership group.

2. The method of claim 1, wherein determining the movement count for each storage drive indicated in the list of unassigned storage drives further comprises:

identifying all RAID extent entries in the RAID mapping table that indicate a drive extent that is located in the storage drive;

for each RAID extent entry in the RAID mapping table that indicates a drive extent that is located in the storage drive, generating an external drive count that is equal to a total number of disk extents indicated by that RAID extent entry that are not located in either i) the storage drive, or ii) a storage drive previously assigned to the first partnership group; and generating the movement count for the storage drive by summing the external drive counts for all the RAID extent entries in the RAID mapping table that indicate a drive extent that is located in the storage drive.

3. The method of claim 2, wherein splitting the initial group of storage drives into the first partnership group and the second partnership group further comprises:

determining a first partnership group size that is equal to one half of a total number storage drives contained in the initial group of storage drives; and wherein assigning the plurality of additional storage drives to the first partnership group further comprises assigning additional storage drives to the first partnership group until a total number of storage drives assigned to the first partnership group is equal to the first partnership group size.

4. The method of claim 3, wherein splitting the initial group of storage drives into the first partnership group and the second partnership group further comprises:

identifying a subset of the RAID extent entries in the RAID mapping table that consists of a plurality of RAID extent entries that each indicate a higher total number of drive extents located on the storage drives contained in the first partnership group than any RAID extent entry in the RAID mapping table not included in the subset;

creating a first RAID extent group corresponding to the first partnership group by assigning the RAID extent entries in the subset of RAID extent entries to the first RAID extent group; and creating a second RAID extent group corresponding the second partnership group by assigning all RAID extent entries in the RAID mapping table other than the RAID extents in the subset of RAID extent entries to the second RAID extent group.

5. The method of claim 4, wherein identifying the subset of the RAID extent entries in the RAID mapping table that consists of the plurality of RAID extent entries that each indicate a higher total number of drive extents located in the storage drives contained in the first partnership group than any RAID extent entry in the RAID mapping table not included in the subset comprises:

calculating a total capacity of the first partnership group, wherein the total capacity of the first partnership group comprises a total number of disk extents allocated from the first partnership group to RAID extent entries in the RAID mapping table;

calculating a total number of RAID extent entries to be assigned to the first RAID extent group that is equal to the total capacity of the first partnership group divided by the number of drive extents indicated by each RAID extent entry;

generating, for each RAID extent entry in the RAID mapping table, a corresponding first partnership group drive extent count equal to a total number of drive extents indicated by the RAID extent entry that are contained in the first partnership group;

generating a sorted list of RAID extent entries by sorting the RAID extent entries in descending order of corresponding first partnership group drive extent count; and selecting a number of RAID extent entries located at the top of the sorted list of RAID extent entries that is equal to the total number of RAID extent entries to be assigned to the first RAID extent group.

6. The method of claim 5, further comprising modifying at least one drive extent indication in at least one of the RAID extent entries to reflect the splitting of the initial group of storage drives into the first partnership group and the second partnership group by:
   selecting, from among the first partnership group and the second partnership group, a destination partnership group and a source partnership group, by i) comparing a total number of free drive extents in the first partnership group to a total number of free drive extents in the second partnership group, ii) selecting the one of the first partnership group and the second partnership group having a larger total number of free drive extents as the destination partnership group, and iii) selecting the one of the first partnership group and the second partnership group having a smaller total number of free drive extents as the source partnership group;
   identifying a drive extent to be released, wherein the drive extent to be released is located in one of the storage drives contained in the source partnership group and is allocated to a RAID extent entry in the RAID extent group corresponding to the destination partnership group;
   allocating a new drive extent from the free drive extents in the destination partnership group to the RAID extent entry in the RAID extent group corresponding to the destination partnership group;
   copying data stored on the drive extent to be released to the new drive extent;
   modifying the RAID extent entry in the RAID extent group corresponding to the destination partnership group to indicate the new drive extent instead of the drive extent to be released; and
   releasing the drive extent to be released to the free drive extents in the source partnership group.

7. The method of claim 6, further comprising:
   detecting the addition of a new storage drive to the data storage system;
   in response to detecting the addition of the new storage drive to the data storage system, comparing a total number of storage drives in the initial group of storage drives to a predetermined maximum drive group size; and
   wherein splitting the initial group of storage drives into the first partnership group and the second partnership group is performed in response to detecting that the total number of storage drives in the initial group of storage drives is equal to the maximum drive group size.

8. The method of claim 7, wherein each RAID extent entry in the RAID mapping table indicates the same number of drive extents;
   wherein a minimum number of storage drives required to provide RAID data protection for the storage object in the data storage system is greater than the number of drive extents indicated by each RAID extent entry in the RAID mapping table; and
   wherein the maximum drive group size is at least twice as large as the minimum number of storage drives required to provide RAID data protection for the storage object in a data storage system.

9. The method of claim 8, wherein a plurality of unallocated drive extents located in storage drives contained in the first partnership group are available as free drive extents to be allocated, in response to detecting a failure of a storage drive contained in the first partnership group, to one or more RAID extent entries in the first RAID extent group, to replace drive extents located in the failed storage drive contained in the first partnership group; and
   wherein a plurality of unallocated drive extents located in storage drives contained in the second partnership group are available as free drive extents to be allocated, in response to detecting a failure of a storage drive contained in the second partnership group, to one or more RAID extent entries in the second RAID extent group, to replace drive extents located in the failed storage drive contained in the second partnership group.

10. The method of claim 9, wherein drive extents are allocated to RAID extent entries in the RAID mapping table such that no two drive extents indicated by any single RAID extent entry are located on the same storage drive.

11. A data storage system that provides RAID (Redundant Array of Independent Disks) data protection for a storage object, comprising:
   at least one storage processor including processing circuitry and a memory;
   a set of physical data storage drives communicably coupled to the storage processor; and
   wherein the storage processor is configured and arranged to:
      generate a RAID mapping table, wherein the RAID mapping table contains a plurality of RAID extent entries, wherein each RAID extent entry indicates a plurality of drive extents that are allocated to the RAID extent entry and that are used by the storage processor to persistently store host data written to a portion of an address space of the storage object corresponding to the RAID extent entry, and wherein each drive extent comprises a contiguous region of non-volatile data storage located on one of the storage drives in the initial group of storage drives;
      split the initial group of storage drives into a first partnership group and a second partnership group, such that RAID extent entries to which drive extents located in storage drives contained in the first partnership group are allocated only indicate drive extents located in the storage drives contained in the first partnership group, and such that RAID extent entries to which drive extents located in storage drives contained in the second partnership group are allocated only indicate drive extents located in the storage drives contained in the second partnership group, wherein to split the initial group of storage drives into the first partnership group and the second partnership group the storage processor is configured and arranged to:
         i) add an indication of each storage drive in the initial group of storage drives to a list of unassigned storage drives,
         ii) assign an initial storage drive to the first partnership group, wherein assigning the initial storage drive to the first partnership group includes removing the indication of the initial storage drive from the list of unassigned storage drives,
         iii) assign a plurality of additional storage drives to the first partnership group, wherein each individual one of the additional storage drives is assigned to the first partnership group at least in part by a) determining a movement count for each storage drive indicated in the list of unassigned storage drives, the movement count representing a number of drive extent allocations that must be changed in the event that the storage drive is added to the first partnership group, b) determining a storage drive indicated in the list of unassigned storage drives that has a lowest movement count, c) assigning, to the first partnership group, the storage drive indicated in the list of unassigned storage drives that has the lowest movement count, and d) updating the list of unassigned storage drives by removing, from the list of unassigned storage drives, the indication of the storage drive indicated in the list of unassigned storage drives that has the lowest movement count, and iv) assign those storage drives indicated in the list of unassigned storage drives after the plurality of additional storage drives has been added to the first partnership group to the second partnership group.

12. The data storage system of claim 11, wherein to determine the movement count for each storage drive indicated in the list of unassigned storage drives the storage processor is further configured and arranged to:

identify all RAID extent entries in the RAID mapping table that indicate a drive extent that is located in the storage drive;

for each RAID extent entry in the RAID mapping table that indicates a drive extent that is located in the storage drive, generate an external drive count that is equal to a total number of disk extents indicated by that RAID extent entry that are not located in either i) the storage drive, or ii) a storage drive previously assigned to the first partnership group; and generate a movement count for the storage drive by summing the external drive counts for all the RAID extent entries in the RAID mapping table that indicate a drive extent that is located in the storage drive.

13. The data storage system of claim 12, wherein to split the initial group of storage drives into the first partnership group and the second partnership group the storage processor is further configured and arranged to determine a first partnership group size that is equal to one half of a total number storage drives contained in the initial group of storage drives; and wherein to assign the plurality of additional storage drives to the first partnership group the storage processor is further configured and arranged to assign additional storage drives to the first partnership group until a total number of storage drives assigned to the first partnership group is equal to the first partnership group size.

14. The data storage system of claim 13, wherein to split the initial group of storage drives into the first partnership group and the second partnership group the storage processor is further configured and arranged to:

identify a subset of the RAID extent entries in the RAID mapping table that consists of a plurality of RAID extent entries that each indicate a higher total number of drive extents located on the storage drives contained in the first partnership group than any RAID extent entry in the RAID mapping table not included in the subset;

create a first RAID extent group corresponding to the first partnership group by assigning the RAID extent entries in the subset of RAID extent entries to the first RAID extent group; and create a second RAID extent group corresponding the second partnership group by assigning all RAID extent entries in the RAID mapping table other than the RAID extents in the subset of RAID extent entries to the second RAID extent group.

15. The data storage system of claim 14, wherein to identify the subset of the RAID extent entries in the RAID mapping table that consists of the plurality of RAID extent entries that each indicate a higher total number of drive extents located in the storage drives contained in the first partnership group than any RAID extent entry in the RAID mapping table not included in the subset the storage processor is further configured and arranged to:

calculate a total capacity of the first partnership group, wherein the total capacity of the first partnership group comprises a total number of disk extents allocated from the first partnership group to RAID extent entries in the RAID mapping table;

calculate a total number of RAID extent entries to be assigned to the first RAID extent group that is equal to the total capacity of the first partnership group divided by the number of drive extents indicated by each RAID extent entry;

generate, for each RAID extent entry in the RAID mapping table, a corresponding first partnership group drive extent count equal to a total number of drive extents indicated by the RAID extent entry that are contained in the first partnership group;

generate a sorted list of RAID extent entries by sorting the RAID extent entries in descending order of corresponding first partnership group drive extent count; and select a number of RAID extent entries located at the top of the sorted list of RAID extent entries that is equal to the total number of RAID extent entries to be assigned to the first RAID extent group.

16. The data storage system of claim 15, further comprising:

wherein the storage processor is further configured and arranged to modify at least one drive extent indication in at least one of the RAID extent entries to reflect the splitting of the initial group of storage drives into the first partnership group and the second partnership group; and wherein to modify the at least one drive extent indication in at least one of the RAID extent entries to reflect the splitting of the initial group of storage drives into the first partnership group and the second partnership group the storage processor is further configured and arranged to:

select, from among the first partnership group and the second partnership group, a destination partnership group and a source partnership group, by i) comparing a total number of free drive extents in the first partnership group to a total number of free drive extents in the second partnership group, ii) selecting the one of the first partnership group and the second partnership group having a larger total number of free drive extents as the destination partnership group, and iii) selecting the one of the first partnership group and the second partnership group having a smaller total number of free drive extents as the source partnership group, identify a drive extent to be released, wherein the drive extent to be released is located in one of the storage drives contained in the source partnership group and is allocated to a RAID extent entry in the RAID extent group corresponding to the destination partnership group, allocate a new drive extent from the free drive extents in the destination partnership group to the RAID extent entry in the RAID extent group corresponding to the destination partnership group, copy data stored on the drive extent to be released to the new drive extent, modify the RAID extent entry in the RAID extent group corresponding to the destination partnership group to indicate the new drive extent instead of the drive extent to be released, and release the drive extent to be released to the free drive extents in the source partnership group.

17. The data storage system of claim 16, wherein the storage processor is further configured and arranged to:

detect the addition of a new storage drive to the data storage system; and in response to detecting the addition of the new storage drive to the data storage system, compare a total number of storage drives in the data storage system to a predetermined maximum drive group size; and split the initial group of storage drives into the first partnership group and the second partnership group in response to detecting that the total number of storage drives in the initial group of storage drives is equal to the maximum drive group size.

18. The data storage system of claim 17, wherein each RAID extent entry in the RAID mapping table indicates the same number of drive extents;

wherein a minimum number of storage drives required to provide RAID data protection for the storage object in the data storage system is greater than the number of drive extents indicated by each RAID extent entry in the RAID mapping table; and wherein the maximum drive group size is at least twice as large as the minimum number of storage drives required to provide RAID data protection for the storage object in a data storage system.

19. The data storage system of claim 18, wherein a plurality of unallocated drive extents located in storage drives contained in the first partnership are available as free drive extents to be allocated, in response to detecting a failure of a storage drive contained in the first partnership group, to one or more RAID extent entries in the first RAID extent group, to replace drive extents located in the failed storage drive contained in the first partnership group; and wherein a plurality of unallocated drive extents located in storage drives contained in the second partnership group are available as free drive extents to be allocated, in response to detecting a failure of a storage drive contained in the second partnership group, to one or more RAID extent entries in the second RAID extent group, to replace drive extents located in the failed storage drive contained in the second partnership group.

20. A non-transitory computer readable medium for providing RAID (Redundant Array of Independent Disks) data protection for a storage object, comprising instructions stored thereon, that when executed on processing circuitry in a storage processor, perform the steps of:

generating a RAID mapping table, wherein the RAID mapping table contains a plurality of RAID extent entries, wherein each RAID extent entry indicates a plurality of drive extents that are allocated to the RAID extent entry and that are used to persistently store host data written to a portion of an address space of the storage object corresponding to the RAID extent entry, and wherein each drive extent comprises a contiguous region of non-volatile data storage located on one of the storage drives in the initial group of storage drives;

splitting the initial group of storage drives into a first partnership group and a second partnership group, such that the RAID extent entries to which drive extents located in storage drives contained in the first partnership group are allocated only indicate drive extents located in the storage drives contained in the first partnership group, and such that RAID extent entries to which drive extents located in storage drives contained in the second partnership group are allocated only indicate drive extents located in the storage drives contained in the second partnership group, at least in part by:

i) adding an indication of each storage drive in the initial group of storage drives to a list of unassigned storage drives, ii) assigning an initial storage drive to the first partnership group, wherein assigning the initial storage drive to the first partnership group includes removing the indication of the initial storage drive from the list of unassigned storage drives, iii) assigning a plurality of additional storage drives to the first partnership group, wherein assigning each individual one of the additional storage drives to the first partnership group includes a) determining a movement count for each storage drive indicated in the list of unassigned storage drives, the movement count representing a number of drive extent allocations that must be changed in the event that the storage drive is added to the first partnership group, b) determining a storage drive indicated in the list of unassigned storage drives that has a lowest movement count, c) assigning, to the first partnership group, the storage drive indicated in the list of unassigned storage drives that has the lowest movement count, and d) updating the list of unassigned storage drives by removing, from the list of unassigned storage drives, the indication of the storage drive indicated in the list of unassigned storage drives that has the lowest movement count, and iv) assigning those storage drives indicated in the list of unassigned storage drives after the plurality of additional storage drives has been added to the first partnership group to the second partnership group.

* * * * *